(12) United States Patent
Herzog-Lang et al.

(10) Patent No.: US 11,084,657 B2
(45) Date of Patent: Aug. 10, 2021

(54) ARTICLE CONTAINER HAVING AN EJECTION DEVICE AND ASSOCIATED SUSPENDED CONVEYING DEVICE

(71) Applicant: TGW Mechanics GmbH, Wels (AT)

(72) Inventors: Viktor Herzog-Lang, Keltern (DE); Josef Reischl, Gunskirchen (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 16/476,379

(22) PCT Filed: Jan. 16, 2018

(86) PCT No.: PCT/EP2018/050972
§ 371 (c)(1),
(2) Date: Oct. 11, 2019

(87) PCT Pub. No.: WO2018/130712
PCT Pub. Date: Jul. 19, 2018

(65) Prior Publication Data
US 2020/0024074 A1    Jan. 23, 2020

(30) Foreign Application Priority Data
Jan. 16, 2017   (DE) .................... 20 2017 100 206.3

(51) Int. Cl.
*B65G 9/00*   (2006.01)
*B65G 47/61*   (2006.01)

(52) U.S. Cl.
CPC ............. *B65G 9/002* (2013.01); *B65G 9/004* (2013.01); *B65G 47/61* (2013.01)

(58) Field of Classification Search
CPC ..... B65G 9/0002; B65G 9/0004; B65G 47/61
(Continued)

(56) References Cited

U.S. PATENT DOCUMENTS 3,338,179 A    8/1967   Klemm
3,533,499 A    10/1970   Harkess
(Continued)

FOREIGN PATENT DOCUMENTS

CH    00089/15       7/2016
CH    710 650 A1    7/2016
(Continued)

OTHER PUBLICATIONS

International Search Report of PCT/EP2018/050972, dated Oct. 16, 2018.
(Continued)

*Primary Examiner* — Gene O Crawford
*Assistant Examiner* — Lester Rushin, III
(74) *Attorney, Agent, or Firm* — Collard & Roe, P.C.

(57) ABSTRACT

An article container for an overhead conveying device for transporting an article includes front and rear walls, a bottom adjoining the front and rear walls, and a storage space between the front and rear walls and the bottom, in which the article is transportable. The bottom forms a first longitudinal edge, which adjoins the front wall, a second longitudinal edge, which adjoins the rear wall, spaced from the first longitudinal edge, a first end edge extending between the first and second longitudinal edges, and a second end edge extending between the first and second longitudinal edges. The article container includes a loading and/or unloading opening delimited by the front wall and rear wall and adjoining the first end edge and a side wall stop adjoining the second end edge, against which the article can be applied in a transport position.

42 Claims, 19 Drawing Sheets

(58) Field of Classification Search
USPC .................................................... 198/465.4
See application file for complete search history.

(56) References Cited

U.S. PATENT DOCUMENTS

| | | | |
|---|---|---|---|
| 3,663,052 A | 5/1972 | Schurch | |
| 3,807,314 A | 4/1974 | Slemmons | |
| 4,104,156 A | 8/1978 | Fletcher | |
| 4,140,163 A | 2/1979 | Usner | |
| 4,727,979 A | 3/1988 | Wolfson et al. | |
| 4,878,577 A | 11/1989 | Romero Lledo et al. | |
| 4,922,829 A | 5/1990 | Kuchta et al. | |
| 4,925,015 A | 5/1990 | Vaida et al. | |
| 4,946,023 A | 8/1990 | Heinold et al. | |
| 5,125,500 A | 6/1992 | Cailbault | |
| 5,142,993 A | 9/1992 | Robu et al. | |
| 5,216,949 A | 6/1993 | Bertozzi | |
| 5,558,201 A | 9/1996 | Oppliger et al. | |
| 5,697,508 A | 12/1997 | Rifkin et al. | |
| 5,878,867 A | 3/1999 | Schneuing | |
| 6,742,648 B2 | 6/2004 | Honegger | |
| 8,607,963 B2 | 12/2013 | Wend et al. | |
| 8,672,118 B2 | 3/2014 | Janzen et al. | |
| 9,187,252 B2 * | 11/2015 | Wend | B65G 9/002 |
| 9,212,013 B2 * | 12/2015 | Fankhauser | B65G 9/004 |
| 9,511,940 B2 | 12/2016 | Schönenberger | |
| 9,630,751 B1 | 4/2017 | Otto | |
| 9,828,182 B2 | 11/2017 | Schoenenberger | |
| 10,005,616 B2 | 6/2018 | Fenile et al. | |
| 10,040,641 B2 | 8/2018 | Fenile et al. | |
| 10,065,800 B2 | 9/2018 | Auf Der Maur | |
| 10,301,114 B2 | 5/2019 | Fenile | |
| 10,322,887 B2 | 6/2019 | Fenile | |
| 10,336,548 B2 | 7/2019 | Fenile et al. | |
| 10,399,779 B2 | 9/2019 | Fenile et al. | |
| 10,494,196 B2 | 12/2019 | Fenile | |
| 10,584,447 B2 | 3/2020 | Fenile et al. | |
| 10,647,523 B2 * | 5/2020 | Sigrist | B65G 9/002 |
| 2003/0135300 A1 | 7/2003 | Lewis | |
| 2004/0089623 A1 | 5/2004 | Harrell | |
| 2007/0029164 A1 | 2/2007 | Bree | |
| 2010/0089722 A1 | 4/2010 | Wiedemann et al. | |
| 2012/0037272 A1 | 2/2012 | Wend et al. | |
| 2012/0216917 A1 | 8/2012 | Janzen | |
| 2014/0284179 A1 | 9/2014 | Janzen | |
| 2014/0291123 A1 | 10/2014 | Olivieri et al. | |
| 2015/0225177 A1 | 8/2015 | Schönenberger | |
| 2016/0046446 A1 | 2/2016 | Matsuoka | |
| 2016/0159558 A1 | 6/2016 | Schneuing | |
| 2017/0015505 A1 | 1/2017 | Schoenenberger | |
| 2017/0088302 A1 | 3/2017 | Auf Der Maur | |
| 2018/0072511 A1 | 3/2018 | Fenile | |
| 2018/0086563 A1 * | 3/2018 | Janzen | B65D 33/02 |
| 2018/0305131 A1 | 10/2018 | Fenile et al. | |
| 2019/0300294 A1 | 10/2019 | Fenile | |

FOREIGN PATENT DOCUMENTS

| | | |
|---|---|---|
| CN | 101636336 A | 1/2010 |
| CN | 104619615 A | 5/2015 |
| DE | 1 233 777 B | 2/1967 |
| DE | 2 221 318 A1 | 11/1973 |
| DE | 81 33 433 U1 | 3/1982 |
| DE | 38 37 115 A1 | 5/1990 |
| DE | 38 40 521 A1 | 6/1990 |
| DE | 40 42 375 A1 | 12/1991 |
| DE | 689 07 399 T2 | 10/1993 |
| DE | 692 01 185 T2 | 5/1995 |
| DE | 297 09 547 U1 | 8/1997 |
| DE | 196 14 905 A1 | 11/1997 |
| DE | 103 09 127 A1 | 9/2004 |
| DE | 103 54 419 A1 | 6/2005 |
| DE | 10 2004 018 569 A1 | 11/2005 |
| DE | 10 2008 026 720 A1 | 12/2009 |
| DE | 10 2008 061 685 A1 | 6/2010 |
| DE | 10 2010 033 905 A1 | 2/2012 |
| DE | 10 2010 053 590 A1 | 6/2012 |
| DE | 10 2011 015 138 A1 | 9/2012 |
| DE | 10 2011 101 987 A1 | 11/2012 |
| DE | 10 2012 018 925 A1 | 3/2014 |
| DE | 10 2012 108 757 A1 | 3/2014 |
| DE | 10 2013 205 172 A1 | 9/2014 |
| DE | 10 2014 203 298 A1 | 8/2015 |
| DE | 20 2017 106 993 U1 | 12/2017 |
| EP | 0 638 501 A1 | 2/1995 |
| EP | 1 420 105 A1 | 5/2004 |
| EP | 1 420 106 A1 | 5/2004 |
| EP | 2 130 968 A1 | 12/2009 |
| EP | 2 196 415 A2 | 6/2010 |
| EP | 2 418 160 A1 | 2/2012 |
| EP | 2 620 394 A1 | 7/2013 |
| EP | 2 786 940 A1 | 10/2014 |
| EP | 2 708 478 B1 | 11/2014 |
| EP | 3 028 961 A1 | 6/2016 |
| EP | 2 686 258 B1 | 9/2016 |
| EP | 3 293 130 A1 | 3/2018 |
| GB | 733714 A | 7/1955 |
| GB | 2 243 816 B | 11/1994 |
| JP | H05-286551 A | 11/1993 |
| JP | H07-304514 A | 11/1995 |
| JP | 3060257 B2 | 7/2000 |
| WO | 90/03853 A2 | 4/1990 |
| WO | 2012/156451 A1 | 11/2012 |
| WO | 2014/012965 A1 | 1/2014 |
| WO | 2014/044601 A1 | 3/2014 |
| WO | 2015/124524 A1 | 8/2015 |
| WO | 2015/124525 A1 | 8/2015 |
| WO | 2016/030274 A1 | 3/2016 |
| WO | 2016/030275 A1 | 3/2016 |
| WO | 2016/120030 A1 | 8/2016 |
| WO | 2016/120031 A1 | 8/2016 |
| WO | 2016/120032 A1 | 8/2016 |
| WO | 2017/202491 A1 | 11/2017 |
| WO | 2018/078098 A1 | 5/2018 |

OTHER PUBLICATIONS

SDI GroupLtd., "SDI Group's MonaLisa Pouch Sortation system" uploaded Jan. 29, 2014 https://www.youtube.com/watch?v=Srj3Tq1lVis (46 pages).

OLYMP, "Das OLYMP Logistik-Zentrum (OLZ)" uploaded Oct. 21, 2013 https://www.youtube.com/watch?v=CWv9zVDlz_Y (88 pages).

Schoneberger-Systeme GmbH, "eCommerce Losung von Schonenberger Systeme" uploaded Oct. 21, 2013—no longer available https://www.youtube.com/watch?v=8DlfUnlHT9k (submitted Jun. 26, 2019 in U.S. Appl. No. 16/438,123, now U.S. Pat. No. 10,494,196).

Chinese Office Action with Search Report in CN 201880015176.0, dated Jul. 23, 2020.

SDI GroupLtd., "SDI Group's MonaLisa Pouch Sortation system" uploaded Jan. 29, 2014 https://www.youtube.com/watch?v=Srj3Tq1lVis (4 pages)(as submitted in U.S. Appl. No. 16/438,123, now U.S. Pat. No. 10,494,196).

OLYMP, "Das OLYMP Logistik-Zentrum (OLZ)" uploaded Oct. 21, 2013 https://www.youtube.com/watch?v=CWv9zVDlz_Y (6 pages) (as submitted in U.S. Appl. No. 16/438,123, now U.S. Pat. No. 10,494,196).

Schoneberger-Systeme GmbH, "eCommerce Losung von Schonenberger Systeme" uploaded Oct. 21, 2013—no longer available https://www.youtube.com/watch?v=8DlfUnlHT9k (7 pages) (as submitted in U.S. Appl. No. 16/438,123, now U.S. Pat. No. 10,494,196).

* cited by examiner

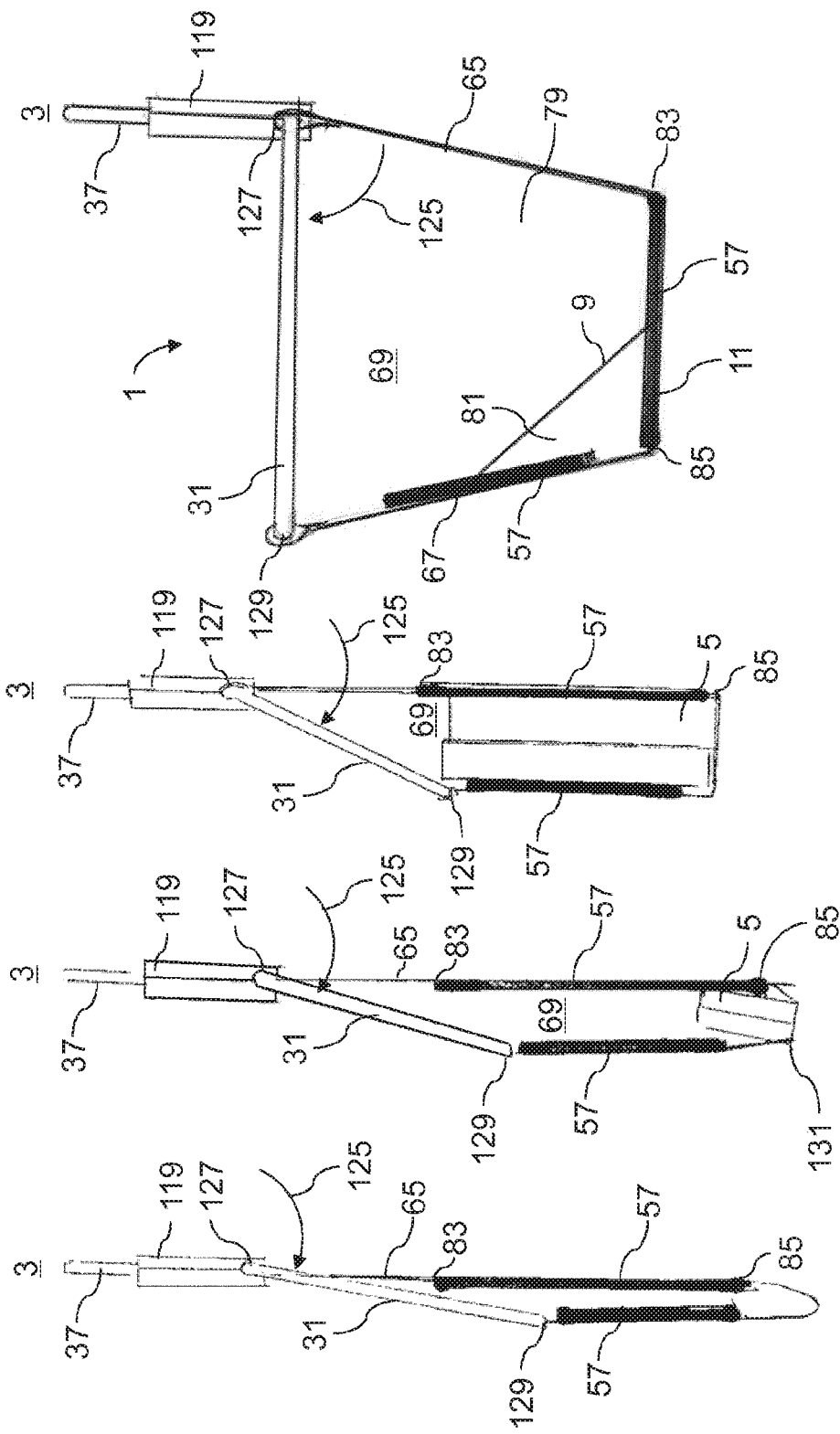

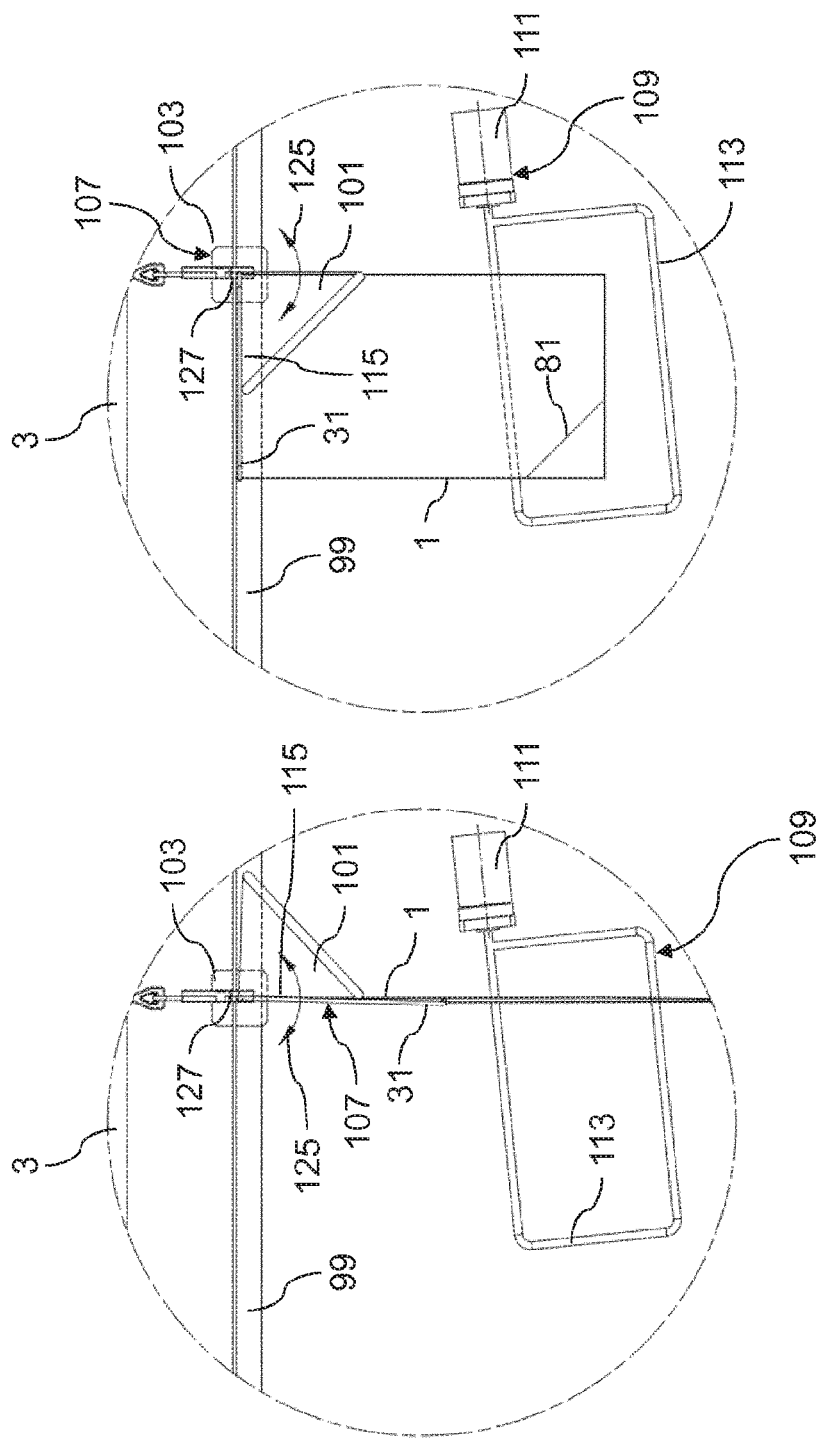

ARTICLE CONTAINER HAVING AN EJECTION DEVICE AND ASSOCIATED SUSPENDED CONVEYING DEVICE

CROSS REFERENCE TO RELATED APPLICATIONS

This application is the National Stage of PCT/EP2018/050972 filed on Jan. 16, 2018, which claims priority under 35 U.S.C. § 119 of German Application No. 20 2017 100 206.3 filed on Jan. 16, 2017, the disclosures of which are incorporated by reference. The international application under PCT article 21(2) was not published in English.

BACKGROUND OF THE INVENTION

Field of the Invention

The invention relates to an article container for transporting an article, an associated overhead conveying device as well as a suspended conveying system for transporting, a loading and an unloading station for loading and unloading, a method for loading and unloading the article container as well as a use of a flexible (non-rigid) material for the article container.

Prior Art

In automated article storage systems, production plants and during article transport, such as for example in mail-order retail, it is required to accommodate articles in article containers in a manner that is, if possible, automated. In these article containers the articles can be stored before they are being delivered and thus get to the station where they are packaged for onward transport to the customer. The transport within the stores is typically done via overhead conveying devices. In this case, the article containers are often bags which are manufactured like fabric bags and are hooked at the top into a rail system using a type of wire arm. Such an article container is known for example from WO 2014/012965 A1. The side wall elements of the former are controlled via a rod assembly in such a way that the side wall elements connected to one another via a connection region can be flipped open. In the area of a loading station the containers are in addition transitioned into a horizontal or inclined position.

Comparable article containers and associated overhead conveying devices are known for example from DE 10 2004 018 569 A1, EP 2 130 968 A1 or EP 2 196 415 A. The transport bags described therein consist of flexible materials in the form of a loop, in which the article is held. For loading, these transport bags are opened at the top in order to be able to insert the article into the loop. An unloading is done by the article either being taken or discharged sideways from the loop or the loop being opened at the bottom, e.g. in accordance with EP 2 130 968 A1. Furthermore, an article container is known from DE 103 54 419 A1 which comprises a relatively stiff and flat plastic wall with a cutout opening for loading and unloading articles.

Other article containers are manufactured like hanging, flat tubs of plastic unilaterally coated with elastic fabrics, which clamp the article.

It is known to load such article containers in a mechanized manner and to unload them manually. A transporting stage is determined by the slowest process, which depends, inter alia, on the quantity of articles. In particular a high number of individual articles can slow down the loading and/or unloading. For example the unloading and/or the assembling of dismantled article containers can determine the maximum possible transporting stage. EP 2 686 258 B1 relates to a suspended conveying system having a transport bag for automated unloading of an article and having an unloading station. The transport bag comprises a horizontal bottom, on which the article can be stored for the purpose of being transported. The bottom cooperates with a lifting device adapted to lift the bottom of the transport bag, which is loaded with at least one article, when the transport bag is in an unloading position in a vertical direction in such a way that the at least one article can be centrally pushed out by means of a pushing device through an end wall of a basic body of the transport bag and wherein the pushing device comprises a slide which engages with an interior of the basic body through a different end wall of the basic body where the at least one article is located when the bottom is lifted. This means that for unloading are required the two opposite, opened end walls, the bottom which is liftable in the vertical direction as well as the slide of the pushing device reaching through one of the end walls.

SUMMARY OF THE INVENTION

Starting from this prior art the object underlying the present invention is to create an article container which allows a transporting stage which is as short as possible, can be loaded and unloaded in a simple manner and/or allows a trouble-free transport and yet has a structure which is as simple as possible.

In an article container for an overhead conveying device for transporting an article, comprising a front wall, a rear wall, a bottom adjoining the front wall and rear wall, a storage space between the front wall, the rear wall and the bottom, in which the article can be transported, wherein the bottom forms a first longitudinal edge which is adjoined by the front wall, a second longitudinal edge extending spaced apart from the first longitudinal edge, which is adjoined by the rear wall, a first end edge extending between the first longitudinal edge and the second longitudinal edge, a second end edge extending between the first longitudinal edge and the second longitudinal edge, the object is achieved by the article container comprising a loading and/or unloading opening delimited by the front wall and rear wall and adjoining the first end edge. The article container is configured to be adjustable between a closed position, in which the storage space is inaccessible and/or of reduced volume, and an opened position, in which the storage space is accessible. In particular the article container can comprise a frame, by means of which the article container is adjustable between the closed position and the opened position. In the closed position an article inserted into the storage space can be transported. In the opened position the article container can be loaded and/or unloaded. In particular the article container comprises, in its opened position, a loading and/or unloading opening delimited by the front wall and rear wall and adjoining the first end edge. In the opened position the bottom extends essentially horizontally between the first longitudinal edge and the second longitudinal edge.

According to the invention it is provided that the loading and/or unloading opening adjoins the first end edge, which, however, does not exclude a side wall extending between the front wall and rear wall above the loading and/or unloading opening. It must merely be ensured that the loading and/or unloading opening is sized in such a way that the largest article can be moved through the loading and/or unloading opening without colliding with the side wall. In particular it is advantageous that for unloading of the article container an article resting on the bottom can be done through the unloading opening and over the first end edge. If loading of the article container is also done through the loading opening, the article can be done through the loading opening and over the first end edge. In this case, the first end edge can also serve as a tipping edge, enabling a reliable unloading and/or loading of the article container. In addition, the article container can be manufactured at particularly low cost.

Preferably the frame has a rectangular outline with two longitudinal sides and two short sides, wherein the front wall and the rear wall are each positioned in an articulated manner at the longitudinal sides of the frame. The frame is tiltable around an axis relative to a suspended support, by means of which the article container can be hung on an overhead conveying device. The suspended support is mounted at one of the longitudinal sides, in particular at the longitudinal side at which the front wall is positioned. Preferably the axis extends through the longitudinal side of the frame at which the front wall is positioned.

According to one embodiment of the invention it is provided that the article container comprises a side wall stop adjoining the second end edge, against which the article can be applied during the transport.

The additional side wall stop can hold the article in the storage space during transport. While typical articles in the closed position of a respective article container are held between the front wall, rear wall and the bottom with sufficient holding force, it proves advantageous if articles deviating from standard measurements or standard forms are additionally held by the side wall stop. Thus, an accidental dropping of the article out of the article container during a transport can be avoided by means of the side wall stop. Further, the article can be pushed into the article container in a simple manner until the former rests against the side wall stop. An accidental dropping out of the article during any too dynamic loading operation can thus be prevented with certainty. Preferably the bottom is inclined toward the side wall stop in order to achieve an even higher level of safety during loading and transport.

According to one design of the invention it is also possible that the article container comprises an opening delimited by the front wall and rear wall and adjoining the second end edge. This opening can also be used as a loading and/or unloading opening.

In this case, the article container is formed without an additional side wall stop. This is because it has become apparent that typical articles in the closed position of the article container can be held with sufficient holding force between the front wall, rear wall and the bottom. Therefore, manufacturing costs of the article container can be reduced to a minimum, as an additional process step in the manufacturing of the side wall stop becomes obsolete. Such a side wall stop is especially cut from a separate material web and joined with the at least one material web for the front wall, rear wall and the bottom, in particular sewn to the front wall and the bottom or the rear wall and the bottom.

Relinquishing the side wall stop may seem trivial at first sight, but in view of the enormously high number of pieces in a logistics plant it reduces investment costs considerably.

If the opening is used optionally as a loading and/or unloading opening, the article container can be loaded and/or unloaded unrestrictedly from both sides. The article container in the loading station can be loaded either from the first side or from the second side. In a preferred embodiment there is a stationary wall on a side opposite the loading side, which is sized to cover the unloading opening between the front wall and rear wall. The height of the wall can vary, however, at least formed sufficiently downward for the second end edge to be positioned somewhat higher than the bottom edge of the wall.

It also proves advantageous if the article container is for example loaded from the first side in the loading station and unloaded from the second side in the unloading station. This is because it has become apparent that when loading the article container from the first side the article ends up being positioned in the rear region of the bottom, and thus closer to the unloading opening than to the loading opening. Therefore, the article container can be unloaded more quickly. One exemplary embodiment provides that the first longitudinal edge forms a first folding edge and the second longitudinal edge forms a second folding edge. The folding edges serve as material hinges to which the bottom is hinged and enable a relative shift between the front wall and rear wall. Thus, the storage space and/or the holding capacity can be increased and decreased. The article container can be used for articles of different sizes and/or be buffered empty in a very space-saving manner or be transported.

It is possible for a width of the bottom between the folding edges to be between 5 mm and 800 mm. The width of the bottom between the folding edges can be varied. Therefore, specially adapted article containers are conceivable.

Alternatively it can be provided that the bottom is inclinable between a transport position, in which the article is storable within the article container, and a discharge position, in which the article is discharged from the article container. By changing the inclination of the bottom into the discharge position toward the loading and/or unloading opening, the unloading of the article container can be made simpler and/or easier. Ideally, the article can slide out of the article container by itself.

Further, it is possible that in a suspended state of the article container the bottom comprises a storage incline between the first end edge and second end edge. In particular, according to one embodiment of the article container having a side wall stop the storage incline is formed toward the side wall stop of an at least partially closed vertical side. The at least partially closed vertical side can comprise and/or form the side wall stop. During the transport due to the storage incline the article automatically slides toward the at least partially closed vertical side and rests against the latter, put away safely. An accidental dropping of the article out of the article container can thus be avoided with certainty or at least be made substantially more difficult.

Another possible variant provides that the bottom in the discharge position comprises a discharge incline toward the loading and/or unloading opening of an at least partially opened vertical side. The discharge incline facilitates the unloading of the article container, wherein the discharge incline is ideally sized in such a way that a parallel component of the force of gravity of the article standing on the bottom overcomes a static friction and the article thus slides out of the article container by itself. Because of the discharge incline, i.e. the inclining of the bottom toward the loading and/or unloading opening, the article can unrestrictedly slide out of the article container and the first end edge adjoining the loading and/or unloading opening is positioned lower than the second end edge disposed opposite the former.

Preferably the bottom can form a receiving surface ending in the loading and/or unloading opening (if according to a first embodiment there is a side wall stop) or in the loading and/or unloading openings (if according to a second embodiment a side wall stop is relinquished), on which the article can be rested. The receiving surface can also define a sliding surface. In is particular the receiving surface extends between the two longitudinal edges and the two end edges. The receiving surface immediately adjoins the first end edge and second end edge. The article can be slidably rested on the sliding surface of the bottom. This facilitates a loading and unloading of the article container, and in particular can the article be pushed into the article container and pulled out of it again in a particularly simple manner.

Preferably it is conceivable that the article container comprises the opened top side opposite the bottom for filling with the article. In this way the article container can be loaded and/or unloaded either through the loading and/or unloading opening or via the opened top side. It is in particular conceivable to load the article container via the opened top side, wherein in this case the article container is preferably already in the open position, so as to carry out the unloading via the loading and/or unloading opening. To that end the bottom can be set to the discharge position.

In another alternative the front wall, rear wall and the side wall stop can form three at least partially closed vertical sides of the article container. The front wall, rear wall and side wall can for example have an identical cut, which allows a particularly simple structure of the article container. A closed vertical side can for example be understood to mean a textile or a foil extending in a vertical direction of the article container. Partially closed can be understood to mean that the textile and/or the foil extends at least in some regions in a vertical direction of the article container. In particular it is conceivable that a partially closed vertical side extends starting at the longitudinal edges and/or end edges across a part of a total height of the article container. This improves access from the top to the article without reducing safety during transport. It is self-evident that optionally only the side wall can form one of the three partially closed vertical sides while the front wall and rear wall each form a completely closed vertical side.

Another exemplary embodiment of the article container provides that the front wall, rear wall and/or the bottom of the article container comprise a flexible (non-rigid) material suspended on a frame. By means of the frame and the flexible material as well as the bottom the storage space can be teetered. A flexible material can be understood to mean a fabric, a foil, a braid, a knitted fabric, a weave and/or similar. By means of the suspended flexible material a very light and flexible-use article container can be provided.

Further, it is possible for the article container to hold, in particular clamp, the article in the closed position between the bottom and the flexible material. The flexible material is preferably supple and can, if applicable, have elastic properties. In this way the article can be surrounded at least in some regions, for example at corners and edges, in a tight-fitting manner by the flexible material. In this way a form and/or friction fit for holding the article within the article container can be caused. The form and/or friction fit can be intensified by a gravity of the article, wherein a self-locking can occur.

The flexible material can be at least partially planked for stiffening the article container. Due to the planking a more stable article container can be provided. The planking can be adapted to different transporting tasks and for example fortify heavily strained regions, in particular of the flexible material.

The flexible (non-rigid) material can preferably be designed at least in some regions electrically conductive in such a way that an electrostatic charge can be counteracted. To that end it can for example have a surface resistance of greater than or equal to $10^6$ ohm and/or a surface resistivity between $10^7$ ohm/square and $10^{12}$ ohm/square. Already in this range an electrostatic charge can be avoided very well, wherein due to the comparatively weak conductivity properties which are important for the transport, the loading and unloading, such as elasticity, foldability and stability, are not affected. In this way the article container can be used for the most varied articles, i.e. also articles which are susceptible to electrostatic discharges. Further, an undesired adherence of the article within the article container by means of electrostatic forces can be avoided. In this way the article container can be more easily loaded and unloaded. A surface resistance and/or surface resistivity can be understood to mean an electric resistance which is measurable at a specific distance between two point-shaped electrodes. A surface resistivity can be understood to mean a resistance measured between two longitudinal electrodes which are arranged in parallel opposite each other, wherein a length of the electrodes corresponds to a distance of the electrodes to each other. Specifically, the surface resistivity can be $2 \times 10^7$ ohm/square. In order to reliably avoid an electrostatic charge, a material is used which is antistatic. Particularly preferably in this case the surface resistivity can be between $10^9$ ohm/square and $10^{12}$ ohm/square.

To that end it is also conceivable that the flexible material comprises electrically conductive fibers and/or electrically conductive wires. Via the electrically conductive fibers and/or wires, electric energy can be discharged for preventing the electrostatic charge. To that end the fibers and/or wires can be connected to a ground.

Preferably the electrically conductive fibers and/or wires can be inserted into the flexible (non-rigid) material at a distance of between 1 mm and 15 mm, preferably about 8 mm. When the distance is greater, comparatively few wires and/or fibers will be needed. For the special tasks of the article container it turned out that a distance of between 1 and 15 mm still ensures a sufficiently good discharge of the load for preventing the electrostatic charge. A distance of about 8 mm has turned out to be a good compromise between saving material and preventing the electrostatic charge.

Particularly preferably the electrically conductive fibers can comprise a carbon fiber material. The carbon fiber material can be woven into the flexible (non-rigid) material and/or positioned on a surface. Any flexible properties are not or only insubstantially affected by the carbon fiber material, while at the same time a stability can be increased and the electrical conductivity can be provided.

It is finally conceivable that the article container comprises a tripping lever connected to the bottom. Via an optional tripping lever the bottom can be adjusted between the transport position and the discharge position in a mechanized or manual manner. In a simple case the bottom can thereby be unilaterally lifted and inclined. Without the tripping lever being actuated, the bottom comprises a storage incline, and, by the tripping lever being actuated, the bottom comprises a discharge incline toward the loading and/or unloading opening. In this way the article can be discharged from the article container in a mechanized and/or manual manner.

The object is further achieved in an overhead conveying device having an article container for transporting articles described above. By means of the overhead conveying device the article container can be transported to a loading station for loading the article container and transported away from the latter and/or transported to an unloading station for unloading the article container and transported away from the latter as well as between the loading station and the unloading station. As to the rest, the advantages described above become apparent.

Moreover the object is achieved in a loading station for manual or automated loading of an article container with an article, which article container comprises a front wall, a rear wall, a bottom adjoining the front wall and rear wall, a storage space between the front wall, the rear wall and the bottom, in which the article is transportable, and which loading station comprises an overhead conveying device for transporting the article container into the loading station and transporting the article container out of the loading station, an opening device for adjusting the article container between a closed position, in which the storage space is inaccessible and/or of reduced volume, and an opened position, in which the storage space is accessible, and, for loading the article container, which has been adjusted into the opened position, either a loading device or a (mechanized) feeding device driven in an automated manner or the loading device and the feeding device, wherein the loading device or the feeding device defines a working plane extending essentially in alignment with the bottom of the article container or slightly above the bottom of the article container, so that an essentially continuous transition is formed between the working plane and the bottom. In this case, the term "essentially continuous transition" is to be understood to mean that while a limited progressive ratio between the working plane and the bottom is possible, the former is, in this case, so small that even a small article is not thrown off onto the bottom in free fall. Rather, the article can be tilted from the working plane onto the bottom.

In particular, for a manual loading, the working plane can be formed by a supporting table. On the latter, a manual shifting of the article through the loading opening into the storage space of the article container can be done in a simple manner. To that end the article container is first adjusted into the opened position. According to an alternative, however, the working plane can also be understood to mean an imaginary plane formed by means of a mechanization, for example a robot. Along the imaginary working plane the article can be moved through the loading opening into the storage space of the article container by means of the robot. It is also possible that the article is moved by a conveying device, for example a belt conveyor, through the loading opening into the storage space of the article container. The conveying plane is in this case formed by the working plane. According to these embodiments, too, the article is not "thrown off" but carefully put down. According to another embodiment a pusher and a supporting table can be used, wherein the article rests on the working plane and is transported through the loading opening into the storage space of the article container in a mechanized manner.

The opening device can comprise a mechanization, by means of which the article container is adjustable between the opened position and the closed position. In a particularly simple design the opening device comprises merely the frame (of the article container), which can be seized and deviated for a manual actuation. To that end the frame can be mounted at the article container deviatably along a swivel axis. For an automatic actuation the opening device can comprise a mechanization acting on the frame which causes the dislocation, preferably deviation, of the frame.

To increase a safety of operation, a locking device for temporarily fixing the article container during a loading operation can additionally be provided. By means of the locking device the article container can be positioned and/or maintained in a desired position. An accidental moving of the article container out of the loading station during a loading operation can be prevented.

In a preferred exemplary embodiment the loading station can additionally comprise a guide profile for guiding a frame of the article container. At the frame the vertical sides of the article container can be suspended and/or tentered. A guiding of the frame also causes a precise desired path of motion of the entire article container. The article container can therefore be dislocated and/or positioned in a desired manner within the loading station. The guide profile can alternatively or additionally be designed for opening the article container.

Further, it can be provided that the opening device of the loading station comprises at least one bag opening flap movable by means of a drive between a first flap position and a second flap position for adjusting the article container between the closed position and the opened position. The bag opening flap preferably acts on the frame of the article container. To that end the bag opening flap can be deviatable around an angle and dislocate, in particular deviate, the frame by means of this deviation movement. In the closed position the bag opening flap is deviated out of a path of motion of the frame. In the opened position the bag opening flap is preferably located below the frame and brings the latter in a horizontal position. It is conceivable to use two bag opening flaps which act on opposite sides of the article container and are synchronously controlled, in this way a torsion-free dislocating of the frame and/or a relief of the load on the drag bearing can be achieved during opening of the article container. Heavier articles can be loaded into the article container.

In another possible embodiment of the loading station it is provided that the bag opening flap in the second flap position comprises a guide surface extending in a direction of movement of the article container for guiding the frame during a leaving of the loading station. By means of the guide surface a desired path of motion of the article container can be achieved during the leaving of the loading station. If applicable, any vibrations and/or oscillations occurring during the acceleration of the article container can be dampened, so that an overall quieter movement and therefore more careful transport of the article within the article container are possible.

Further, it is possible that the frame in the second flap position is fixed in a friction fit between the bag opening flap and the guide profile. The bag opening flap can be pressed against the frame, so that the latter, in turn, is pressed against the guide profile. In this way the friction fit can be caused. By means of a fixing of the frame, in addition to a causing of the opened position, the entire article container can also be locked and/or fixed within the loading station.

The loading station preferably comprises an article container described above. The article container described above can be loaded in the loading station. Regarding the article container and the interaction of the loading station, the advantages described above become apparent as to the rest.

The object is further achieved in an unloading station for unloading an article container loaded with at least one article, which article container comprises a front wall, a rear wall, a bottom adjoining the front wall and rear wall, a storage space between the front wall, the rear wall and the bottom, in which the articles can be transported, and which unloading station comprises an overhead conveying device for transporting the article into the unloading station and transporting the article container out of the unloading station, an opening device for adjusting the article container between a closed position, in which the articles are stowed or stowable in the storage space, and an opened position, in which the articles are accessible in the storage space, and an unloading device for unloading the article container, which has been adjusted into the opened position, with the help of which the bottom is inclinable between a transport position, in which the article is stored in the storage space, and a discharge position, in which the article is discharged from the storage space. In the unloading station the article container can initially be brought from the closed position into the opened position. Either still during the opening operation of the article container or after the opening operation of the article container the inclination of the bottom can be adjusted in such a way that the article is discharged from the storage space, for example slides out of the latter by itself. This change in the inclination can be done by means of the mechanization or manually. Any reaching into the storage space for unloading the article container is not required. The unloading can therefore be done in a particularly simple and safe manner. Any collisions of an operator and/or robot and/or pusher with the article container cannot occur, as a reaching into and/or moving into a path of motion of the article container for unloading are not required. Rather, the article slides out of the latter by itself and can then accordingly be processed further.

A preferred design of the unloading station provides, analog to the design of the loading station, that a locking device for temporarily fixing the article container during an unloading operation is additionally provided. The advantages described above become apparent.

Further, a guide profile for guiding a frame of the article container can additionally be provided. The guide profile can have a structure analog to that of the loading station, wherein the same advantages become apparent.

Preferably the opening device comprises at least one bag opening flap movable by means of a drive between a first flap position and a second flap position for adjusting the article container between the closed position and the opened position. It is conceivable that the bag opening flap in the second flap position comprises a guide surface extending in the direction of movement of the article container for guiding the frame during a leaving of the unloading station. In another exemplary embodiment of the unloading station the frame in the second flap position is fixed in a friction fit between the bag opening flap and the guide profile. The bag opening flap preferably has the same structure as in the loading station. Regarding the function and method of operation the advantages described above become apparent.

An optional pusher dog mechanism of the unloading device of the unloading station allows for the bottom to be adjustable between the transport position and the discharge position. The pusher dog mechanism is formed in a preferred embodiment in accordance with FIGS. 6, 7. Alternatively, by means of the pusher dog mechanism for example a lever mechanically connected to the bottom can be actuated, for example lifted and lowered, in order to adjust the inclination of the bottom in accordance with an exemplary embodiment according to FIG. 3.

In another possible embodiment, the unloading device can comprise a bag unloading device, in particular bag unloading brackets, movable between an initial position and an actuation position by means of an unloading drive, for adjusting the bottom between the transport position and the discharge position. The bag arm of the bag unloading device can for example be dislocated or preferably deviated by means of the unloading drive and therefore be brought in contact with the bottom in such a way that the latter is inclined, i.e. unilaterally lifted, during another dislocation and/or deviation. In this way the article can slide out of the storage space. After unloading has finished, the bag unloading device, i.e. in particular the bag unloading bracket, can be moved and/or deviated out of the path of motion of the transport container and the article container be adjusted into the closed position, so that the former can leave the unloading station in a collision-free manner.

The unloading station preferably comprises an article container described above. The unloading station interacts with the article container for unloading the latter. A particularly simple mechanized and/or partially manual unloading of the article container can be done. As to the rest, the advantages described above become apparent.

The object is also achieved by means of a suspended conveying system comprising an overhead conveying device described above having an article container described above for transporting articles, a loading station described above for manual or automated loading of an article container and an unloading station described above for unloading an article container loaded with at least one article. With the suspended conveying system transport tasks of articles for dispatch purposes can be accomplished in a simple manner. As to the rest, the advantages described above become apparent.

The suspended conveying system preferably comprises a suspended support conveyable in a direction of movement of the article container, which is fixable in the loading station and/or the unloading station by means of a locking device. The article container can be hooked to the suspended support. The suspended support can be conveyed by means of the overhead conveying device. By a fixing of the suspended support in the loading and/or unloading station by means of the locking device, therefore, also the article container can be fixed. In this way a trouble-free and safe loading and unloading of the article container can be done.

The locking device can be formed in particular by means of a fixing plate which is either releasable or fixable between an initial position and a fixed position. The fixing plate acts preferably on the suspended support and can fix the latter by means of a friction and/or form fit.

The object is further achieved by a method for unloading an article from an article container, in particular an article container described above, in which the article container is transported on an overhead conveying device to an unloading station into a provisioning position and in a first step is adjusted at the unloading station by means of an opening device or by an operator from a closed position, in which the article is stowed in the storage space, into an opened position, in which the article is accessible in the storage space, and the bottom is subsequently in a second step inclined by means of an unloading device from a transport position, in which the article is stored in the storage space, into a discharge position, in which the article is discharged from the storage space, so that in the discharge position a rear region of the bottom positioned opposite the loading and/or unloading opening is positioned higher than a front region of the bottom and the article slides out of the article container. The article can therefore be discharged from the storage space of the article container without additional use of force, with the exception of a parallel component of the force of gravity acting on the former, and thus contactlessly. Any manual and/or mechanized reaching into the storage space is not required. Any reaching through two opposite open sides, for example by means of a pushing device, is also not required.

The object is additionally achieved by a method for manual or automated loading of an article container, in particular of an article container described above, with at least one article, in which the article container is transported to a loading station on an overhead conveying device and is provisioned in a provisioning position in front of a loading device or a feeding device, wherein in a first step the article container is adjusted by means of an opening device or by an operator from a closed position, in which the storage space is inaccessible and/or of reduced volume, into an opened position, in which the storage space is accessible, and the article is subsequently in a second step brought by the loading device or the feeding device into the storage space of the article container, which has been adjusted into the opened position, wherein a working plane at the loading device or the feeding device extends essentially in alignment with the bottom of the article container or slightly above the bottom of the article container, so that an essentially continuous transition is formed between the working plane and the bottom. In this case, the term "essentially continuous transition" is to be understood to mean that while a limited progressive ratio between the working plane and the bottom is possible, the former is, in this case, so small that even a small article is not thrown off onto the bottom in free fall. Rather, the article can be tilted from the working plane onto the bottom. The working plane can be a table surface or an imaginary plane formed by means of a mechanization such as a robot. In the case of a manual loading by means of a table the article can be pushed into the article container in a sliding movement along the working plane. This is also possible in a mechanized manner by means of the robot. According to this embodiment the article is not "thrown off" but carefully put down. According to another embodiment a pusher and a supporting table can be used, wherein the article rests on the working plane and is transported through the loading opening into the storage space of the article container in a mechanized manner.

Another achieving of the object becomes apparent when using a flexible material for an article container, in particular an article container described above, for an overhead conveying device for transporting articles, in particular an overhead conveying device for transporting articles described above, and/or for carrying out a method described above for loading an article container with at least one article, in particular an article described above, and/or for carrying out a method, in particular a method described above, for unloading an article from an article container, in particular an article container described above, from the fact that the flexible material comprises at least one of the following electrical properties: a surface resistance of greater than or equal to $10^6$ ohm, a surface resistivity between $10^{17}$ ohm/square and $10^{12}$ ohm/square. Specifically, the surface resistivity can be $2\times10^7$ ohm/square. In order to reliably avoid an electrostatic charge, a material is used which is antistatic. Particularly preferably in this case the surface resistivity can be between $10^9$ ohm/square and $10^{12}$ ohm/square. Any undesired electrostatic charges can be avoided. In this way an undesired adherence of the article to the article container by means of electrostatic forces as well as any damage by electrostatic discharges can be avoided.

The object is further achieved by means of an article container according to the invention.

The article container comprises a bottom and a discharge device mechanically associated with the former. The discharge device can be actuated in such a way that the bottom is adjustable between a transport position and a discharge position. In the transport position any article to be transported in the article container can be held and/or stored safely within the article container, so that in particular an accidental dropping out of the article is avoidable with certainty. In the discharge position the article can drop out of the article container in particular following gravity. Alternatively, however, it is conceivable that an additional mechanical discharge movement for moving the article takes place, in particular the article can be lifted together with the bottom by an actuation of the discharge device in such a way that the article drops out of the article container by itself. The discharge device is mechanically associated with the bottom and can be actuated manually or preferably in a mechanized, automated manner, if applicable, i.e. moved back and forth between the transport position and the discharge position. Preferably the article can be discharged with process safety from the article container at the opened vertical side and/or through the latter. The article container is therefore loadable and unloadable in the same small amount of time, in particular independent of a number of piece goods currently conveyed in the article container.

In a preferred design of the article container the bottom has different gradients due to an actuation of the discharge device. In a suspended state of the article container, due to the storage incline toward the at least one closed vertical side, a parallel component of the force of gravity can act on the article toward the closed vertical side. In this way the article is brought in contact with the closed vertical side and cannot readily drop out of the article container during the transport. Preferably the storage incline is reversed and/or changed in a direction by an actuation of the discharge device in such a way that the article, due to the relevant parallel component of the force of gravity slides toward the other, opened vertical side and can thus be discharged from the article container. The relevant discharge gradient toward the opened vertical side is preferably selected in such a way that the article starts sliding by itself and slides out of the article container by itself via the inclined bottom. In this way an unloading of the article container can be done particularly quickly and safely. In particular this can be done in an automated and/or mechanized manner by a relevant mechanized actuation of the discharge device.

Preferably the article container encloses any article located inside it from three sides, i.e. comprises three closed vertical sides. In this way the article can be held even better within the article container during the conveying.

In another preferred exemplary embodiment the article container is loadable from the top. To that end the article container comprises an opened top side opposite the bottom. The opened top side can be held open in particular by a frame and/or wire arm, wherein relevant fabrics and/or wall elements of the side are attachable and/or hookable to the wire bracket.

In another design of the article container it is possible that the discharge device is actuated merely by its kinetic energy upon a moving past a pusher dog mechanism and the article container is thereby emptied. By means of the pusher dog mechanism the discharge device can be actuated in an automated, mechanized manner. The pusher dog mechanism can for example comprise a link motion positioned on the overhead conveying device for actuating and, if applicable, reactuating the discharge device. Additional actuation elements such as motor operators and/or similar are not required to empty the article container during the moving past the pusher dog mechanism.

Further, in another design the article container in a suspended state can be pivotable around its yaw axis. In this way it can be selected in which direction the opened vertical side faces, for example in the direction of movement, against the direction of movement or sideways. As the article is discharged through the opened vertical side, it can be set by means of a relevant turning of the article container whether the article is discharged sideways, along the direction of movement or against the latter. In this way the article can e.g. be discharged onto slides positioned laterally at the overhead conveying device. A yaw axis can be understood to mean a vertical axis, a Z-axis and/or an axis extending parallel to one of the vertical sides.

In another embodiment of the article container the discharge device comprises a tripping lever connected to the bottom. The tripping lever can thus act directly on the bottom and in particular set the storage incline and the discharge incline. The tripping lever is in particular provided as a rod and/or oblong strip, in particular sewn into a fabric conduit of the bottom. In this way the discharge device can be manufactured in a particularly simple manner at low cost and comprises a minimal mechanical complexity.

Preferably the tripping lever extends at least partially along the bottom and/or comprises a protrusion at one of the sides opposite the opened vertical side, in particular at the closed vertical side. At the protrusion the tripping lever can be actuated in a simple manner, in particular manually and/or in a mechanized manner. Via the sliding surface the article can slide is out of the article container through the opened vertical side. This results in a simple and safe unloading of the article container.

In another preferred embodiment design the article container comprises flexible wall elements, in particular the closed vertical sides and the bottom can be manufactured out of the flexible material such as a textile, a foil and/or similar. In this way the article container can be flexibly filled with the article and comprises a comparatively small weight and/or is in a non-filled state reducible to a minimal cubic measure. Further, a local form fit between the article and the flexible material can thereby take place, wherein the flexible material is locally bulged due to a preferably elastic deformation. In this way, in addition to a friction fit at the closed vertical sides and a parallel component of the force of gravity induced by the storage incline, the article can be additionally fixed during the transport in the article container.

It is possible to plank the flexible material at least partially. In this way the article container can be stiffened completely or at least partially, in particular a sliding surface can be formed by such a planking.

Finally, the discharge device of the article container can comprise a rerouting mechanism. By means of the rerouting mechanism the discharge device can be actuated. In this way the discharge device can be adjusted more flexibly to the overhead conveying device, in particular a relevant pusher dog mechanism. If applicable, an actuation of the tripping lever which is spatially separated from the former is possible.

The object is further achieved by means of an overhead conveying device according to the invention. The overhead conveying device serves to convey an article container, in particular an article container described above. In this respect the advantages described above become apparent. The overhead conveying device comprises a pusher dog mechanism interacting with the article container, which allows a discharge of the article, in particular a direct actuation of a discharge device of the article container by means of the kinetic energy of a moving past of the article container. By moving past the pusher dog mechanism the article container can therefore be emptied.

An exemplary embodiment of the overhead conveying device provides that a rerouting mechanism of the article container is actuatable by means of the pusher dog mechanism. Due to the rerouting mechanism, a simpler and/or spatially simpler arrangement of the pusher dog mechanism of the overhead conveying device can be achieved.

The pusher dog mechanism can comprise an inclined surface, which can be brought in flush contact with the article container, in particular with the bottom of the latter, upon a moving past. In this way the bottom can be dislocated in such a way that the article is easily discharged. The surface can be disposed at the pusher dog mechanism ascending in the direction of movement at first and then descending again. In this way a lifting and a subsequent lowering of the bottom can be done without further aids. The resulting movement of the bottom is thereby as gentle and jerk-free as possible.

Additionally or alternatively the surface can also be inclined sideways and/or transversely to the direction of movement, in particular by circa 90° to the direction of movement. In this way a sideways discharge of the article can be done. The opened vertical side of the article container can to that end also be arranged laterally, viewed in the direction of movement, during the conveying.

The object is further achieved by means of the conveying arrangement comprising an article container, an overhead conveying device and a pusher dog mechanism, in particular each as described above. The advantages described above become apparent.

A preferred exemplary embodiment of the conveying arrangement comprises a separately installable pusher dog mechanism. The latter can be positioned independent of the remaining conveying arrangement in a selectable place in a conveying path of the overhead conveying device by simple installation. A conveying path can be understood to mean an imaginary spatial region through which the article is conveyable, in particular a trajectory of movement of the article in conveyance. During a conveyance of the article a desired collision of the article with the pusher dog mechanism can thereby be generated, which leads to a discharge of the article. This can be done without further auxiliary energy, i.e. merely by means of the conveying movement along the conveying path.

Other advantages become apparent from the description of a preferred exemplary embodiment below.

BRIEF DESCRIPTION OF THE FIGURES

The invention will be elucidated in more detail below by means of an embodiment illustrated in the figures, wherein

FIG. 10 shows a lateral view of the article container shown in the FIGS. 8 and 9 without articles and in a closed position;

FIGS. 11 and 12 show the view of the article container shown in FIG. 10, but with a small and a larger stowed-away article;

FIG. 13 shows the view of the article container shown in the FIGS. 11 and 12, but without an article and in an opened position;

FIG. 21 shows a detail of the article container shown in the FIGS. 18 to 20 in a side view, wherein the article container is adjusted into a closed position;

FIG. 22 shows the detail shown in FIG. 21, wherein the article container has been brought from a closed position shown in FIG. 21 into an opened position by means of a bag opening flap.

DESCRIPTION OF PREFERRED EXEMPLARY EMBODIMENTS

Before the invention is described in detail it is to be noted that it is not restricted to the respective components of the device as well as the respective process steps, as these components and process steps may vary. The terms used here are intended for the sole purpose of describing particular embodiments and are not used in a limiting manner. Also, wherever the singular or indefinite articles are used in the description or in the claims, this shall also refer to the plural of these elements, unless the overall context clearly suggests otherwise.

Figure 1:
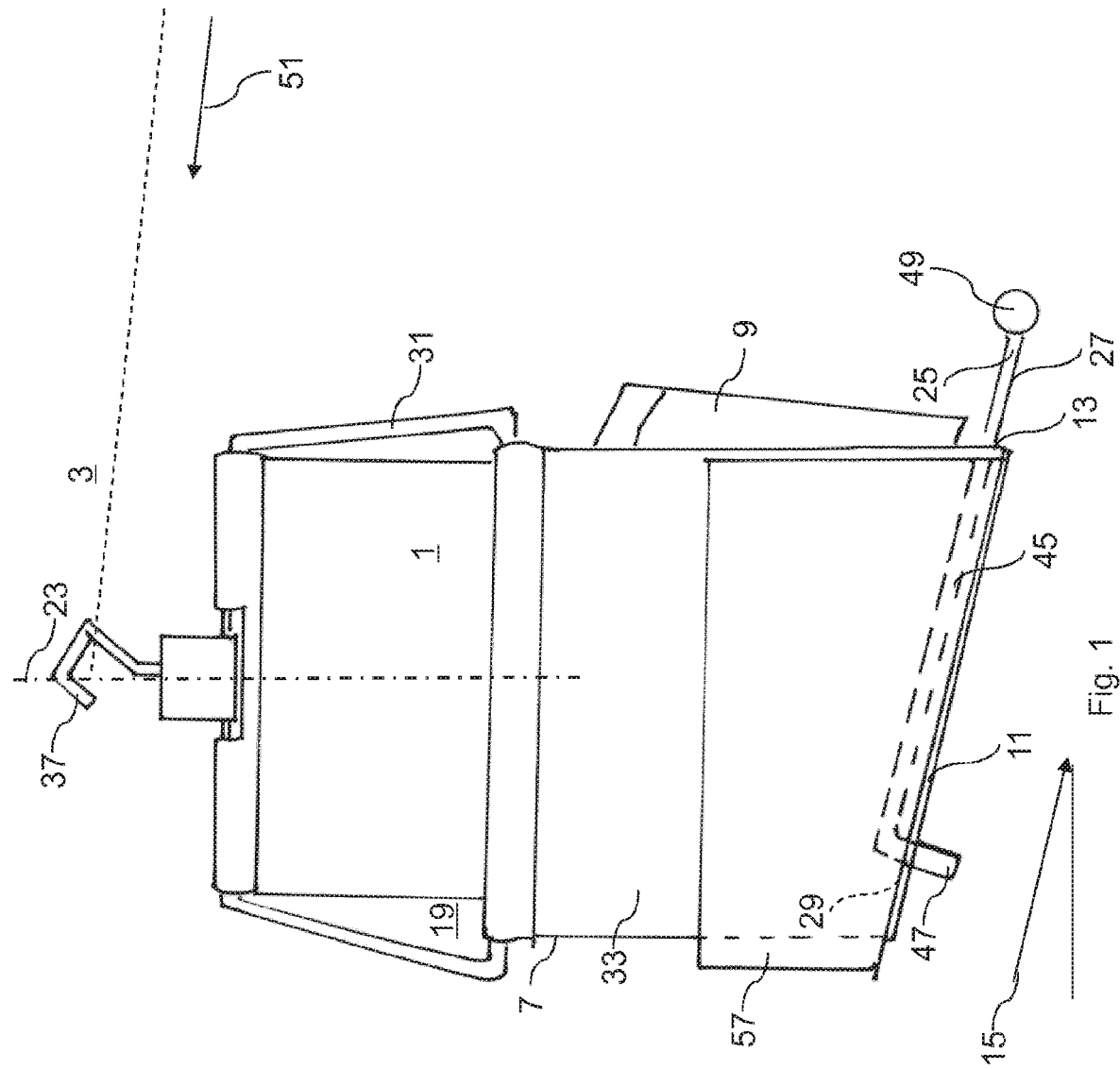
FIG. 1 shows a schematic rear view onto an article container in a first embodiment having a discharge device.
Figure 2:
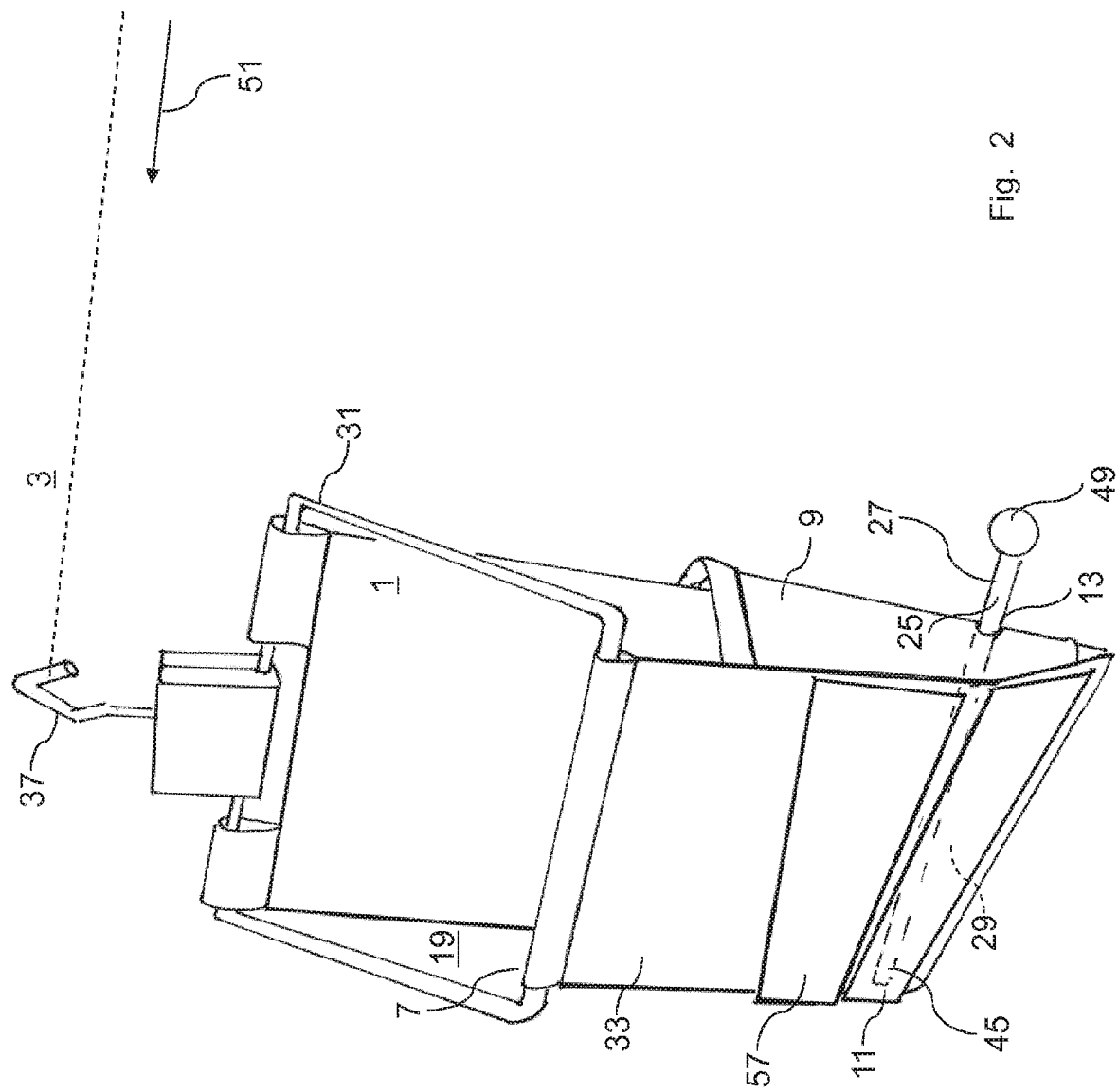
FIG. 2 shows the article container shown in FIG. 1 in a three-dimensional oblique lateral-to-rear view.
Figure 3:
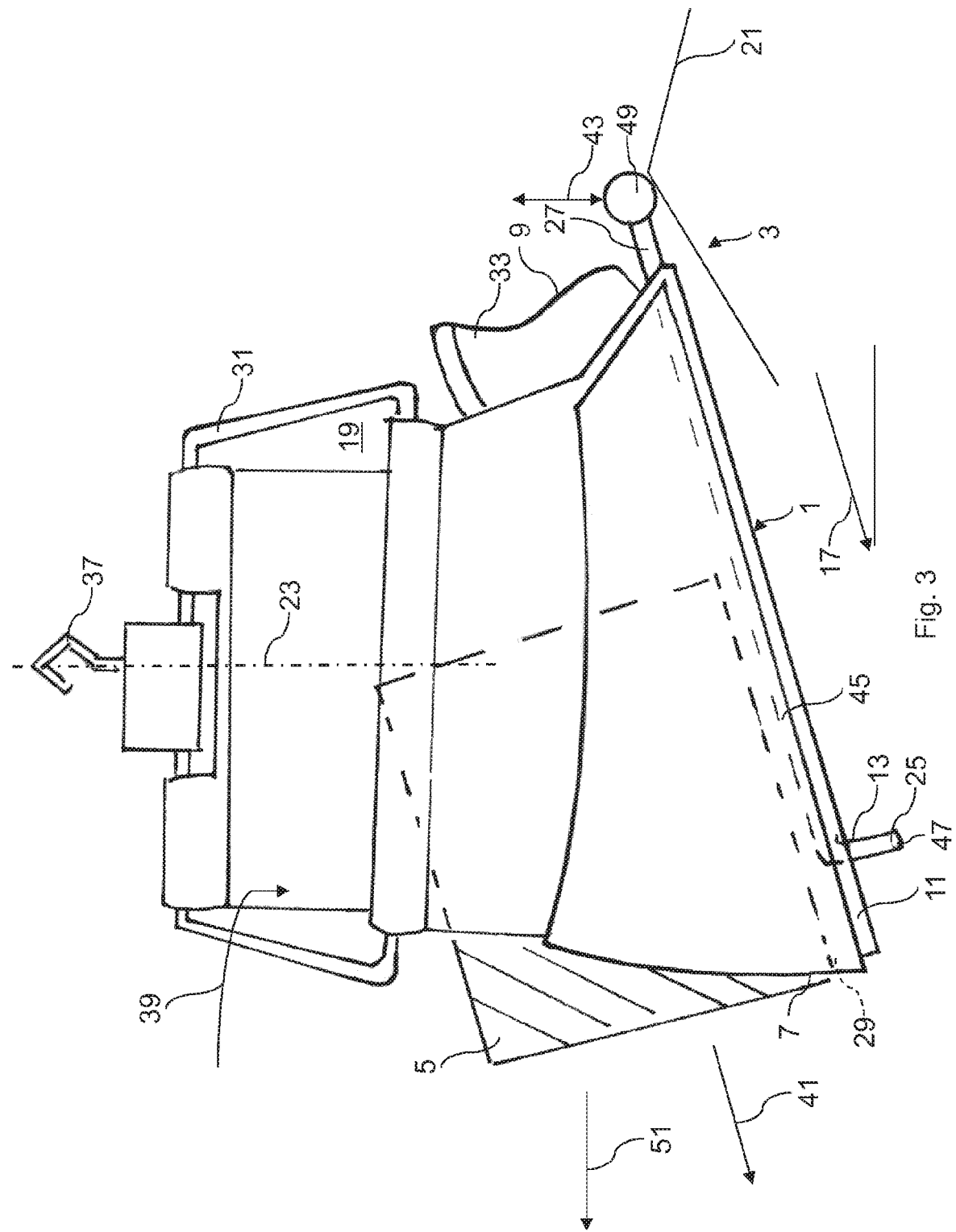
FIG. 3 shows another schematic rear view of the article container shown in FIGS. 1 and 2, but together with a schematically marked article and in a discharge position of the discharge device.

The FIGS. 1 to 3 show an exemplary embodiment of an article container 1 for an overhead conveying device 3, wherein the FIGS. 2 and 3 show a discharge device 13 of the article container 1 in different positions, namely a transport position in FIG. 2 and a discharge position in FIG. 3. The FIGS. 1 to 13 are referenced in equal measure below, unless explicitly stated otherwise.

The article container 1 can be hooked into the overhead conveying device, which is merely indicated by means of the reference number 3, and be transported and/or conveyed by means of the latter. To that end the article container 1 comprises a hook 37, which can be hooked into a relevant accommodation of the overhead conveying device 3 not depicted in its entirety here.

As schematically indicated in FIG. 3, an article 5 can be accommodated and/or transported within the article container 1.

The article container 1 comprises an opened vertical side 7, through which the article 5 in the discharge position shown in FIG. 3 can be discharged.

The loading of the article container 1 can be done through a frame 31, which tenters an opened top side 19 of the article container 1. Generally, however, a loading is also possible via the opened vertical side 7. The loading of the article container 1 with the article 5 is indicated by means of a curved arrow 39 in FIG. 3. The loading and/or an unloading direction is indicated in FIG. 3 by means of an arrow 41. The unloading direction in accordance with the arrow 41 extends along a discharge incline 17, which is producible by means of the discharge device 13. To produce the discharge incline 17, a tripping lever 25 of the discharge device 13 can be actuated. More precisely, it can be actuated vertically upward in a direction of an arrow 43. The tripping lever 25 is connected to a bottom 11 of the article container 1 and in particular sewn into a fabric conduit 45 of the bottom 11. In order to secure the tripping lever 25 against a pulling out of the fabric conduit 45, the former can comprise a cranked end 47.

As can be seen in the FIGS. 1 and 2, the article container 1, in addition to the opened vertical side 7, comprises three closed vertical sides 9. The article 5, during conveyance and in the transport position of the discharge device 13 show in the FIGS. 1 and 2, can be brought in contact with the latter.

As marked in FIG. 1, the bottom 11 comprises a storage incline 15 in the transport position, which storage incline 15 is inclined in an opposite direction to the discharge incline 17. In this way the article 5 can slide to the closed vertical side 9 opposite the opened vertical side 7 and be brought in contact with the former. In this way an accidental dropping of the article 5 out of the article container 1 during the transport can be avoided with certainty.

As can be seen in FIG. 3, the overhead conveying device 3 can comprise a pusher dog mechanism 21. The pusher dog mechanism 21 comprises in particular a link motion, which can interact with a guide knob 49 at one end of a protrusion 27 of the tripping lever 25. By means of the pusher dog mechanism 21 the guide knob 49 can be vertically lifted and lowered again in the direction of the arrow 43 along a direction of movement 51 during a moving past of the article container 1. In this way the tripping lever 25 can be deviated in a mechanized manner and without additional actuating drives for adjusting the storage incline into the discharge incline 17 and back again.

In a preferred exemplary embodiment the article container 1 in a hooked state on the overhead conveying device 3 is deviatable around a yaw axis 23, which is marked out in an exemplary manner in the FIGS. 1 and 3. In this way the opened vertical side 7, which faces toward the left-hand side, i.e. in the direction of movement 51, in an exemplary manner in FIG. 3, can also be set at a random angle to the direction of movement 51 or opposite the latter. In this way the article 5, if desired, can be discharged sideways, e.g. at an angle of approximately 90 degrees to the direction of movement 51 from the article container 1, in particular on slides positioned laterally at the overhead conveying device 3.

Figure 4:
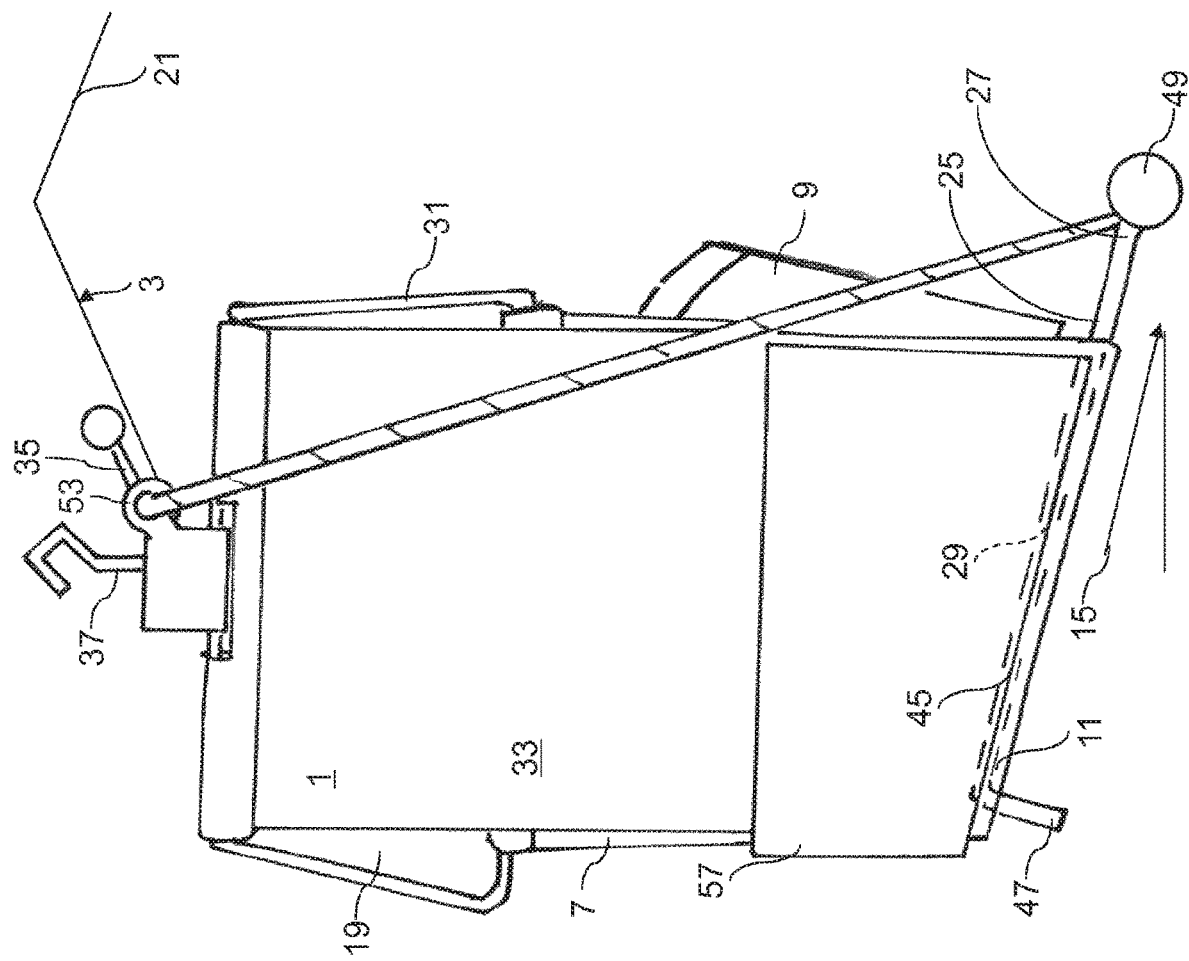
FIG. 4 shows a front view of a second embodiment of an article container having a rerouting mechanism for actuating the discharge device.
Figure 5:
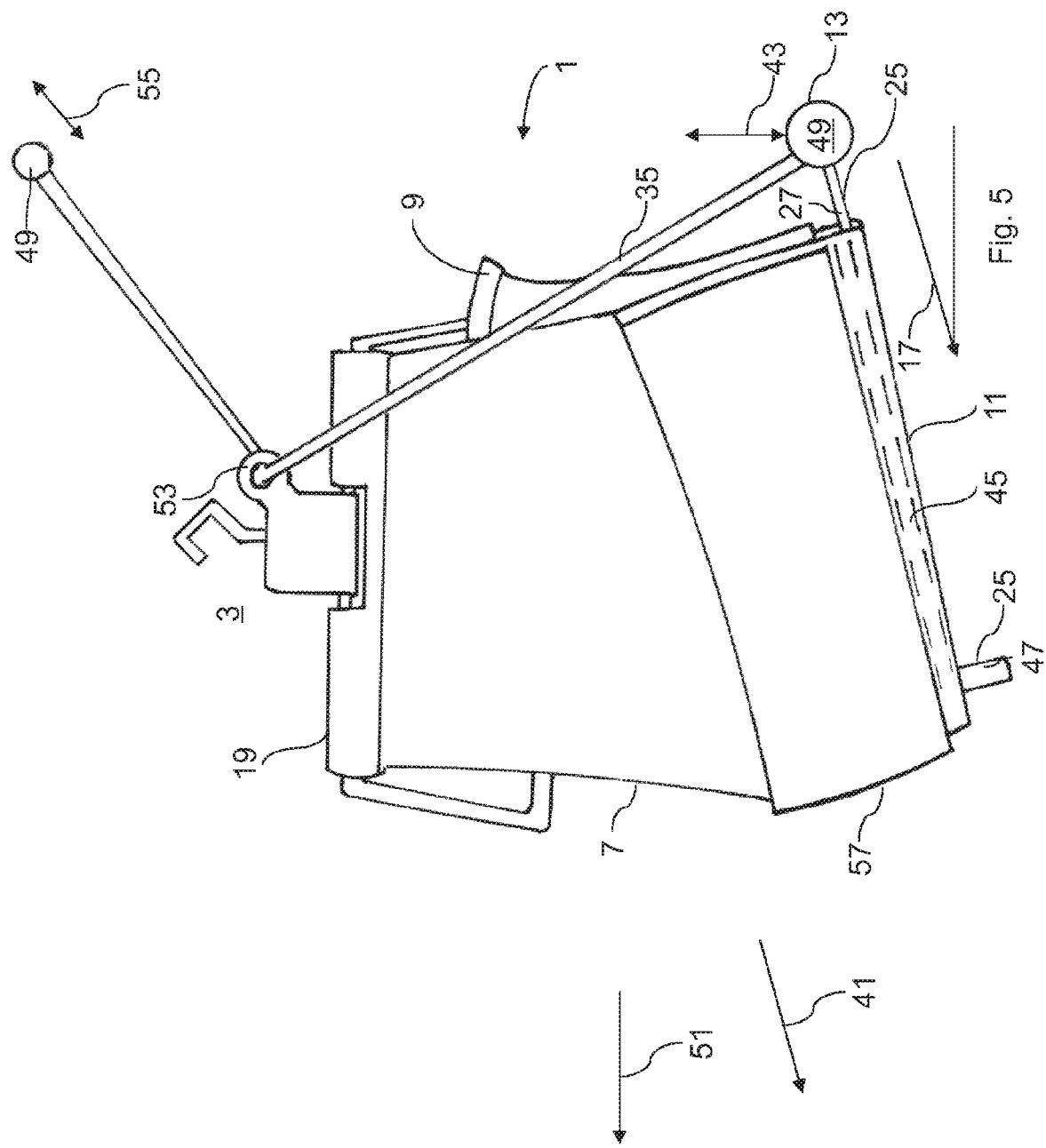
FIG. 5 shows the article container shown in FIG. 4, but in the discharge position of the discharge device.

The FIGS. 4 and 5 show a front view of another embodiment of an article container 1, wherein FIG. 4 shows a transport position and FIG. 5 shows a discharge position. In contrast to the illustration of the FIGS. 1 to 3, the article container 1 and/or the discharge device 13 of the article container 1 additionally comprises a rerouting mechanism 35. The rerouting mechanism 35 is positioned at the end of the tripping lever 25 opposite the cranked end 47 and leads, via an eyelet 53 which reroutes an actuation force, upward into the vicinity of the hook 37 of the article container 1. By means of the rerouting mechanism 35 the discharge device 13 can be actuated at a spatial distance to the former, in particular to the tripping lever 25. In particular, the rerouting mechanism 35 comprises a rope hoist, which causes a lifting of the tripping lever 25 by means of a pull in the direction of an arrow 55 and/or a lowering of the tripping lever 25 by means of a letting go again. Due to the rerouting mechanism 35 the discharge device 13 can be operated in a particularly simple manner.

As can be seen in the FIGS. 3 and 5, the article container 1 comprises in particular a flexible (non-rigid) material 33, which allows the lifting of the bottom 11. In particular, it is conceivable that for a stiffening of the flexible material 33 the latter comprises a planking 57 on the inside or on the outside. In particular, the bottom 11 can comprise such a planking 57 in order to allow a safe storing of the article 5 within the article container 1. Furthermore it is conceivable that the bottom 11 and/or the planking 57 comprise a sliding surface 29, along which the article 5 can be slidably rested in accordance with the storage incline 15 or the discharge incline 17. Preferably the sliding surface 29 can comprise a friction-reducing material, in particular PTFE (polytetrafluoroethylene) and/or similar.

Due to the mechanized actuation of the discharge device, particularly short loading cycles can be achieved, in particular 3,000 to 4,500 loading operations and corresponding unloading operations and/or removal operations. Advantageously, the article container 1 can be filled and emptied in a fully automated manner. Further, the article container 1 need not be disassembled during the unloading of the article 5. Rather, the former can continue to be used again, i.e. be loaded, immediately after the unloading. In this way, too, a particularly short cycle time can be achieved. Advantageously, the article container 1 can be manufactured at particularly low cost due to its simple structure of a small number of parts. Further, existing article containers can be retrofitted with a discharge device shown in the FIGS. 1 to 5. To that end the tripping lever 25 can be positioned at, in particular sewn to, the bottom 11 in a simple manner.

Advantageously the article container 1 is closed on three sides and comprises the inclinable bottom 11. In this way a conveying of the article 5 which is secured against dropping out and a simple unloading are ensured. By means of the tripping lever 25 sewn into the fabric conduit a low side of the bottom 11 shown at the right-hand side in the FIGS. 1, 2 and 4, viewed in a suspended state of the article container 1, can be lifted, whereby the discharge incline 17 is produced. The handling can either be done manually or preferably by means of the pusher dog mechanism 21, in particular a metal skid and/or a link motion, past which the article container 1 moves. Alternatively this can be done from above as illustrated in the FIGS. 4 and 5, i.e. by means of the rerouting mechanism 35. Preferably this is done by pure kinematic energy of movement of the article container 1 during the moving past, so that additional actuation elements and/or motor operators and/or an interrupting of the movement along the direction of movement of the article container 1 are not required. Therefore, a so-called fragmented movement, which would, if applicable, entail mechanical, procedural and/or sensory complexity, is not required.

The article container 1 and/or the suspended device 3 can be adapted in such a way that the pivoting around the yaw axis 23 is possible, so that the article 5 can also be discharged toward the right or left onto outgoing slides.

Figure 6:
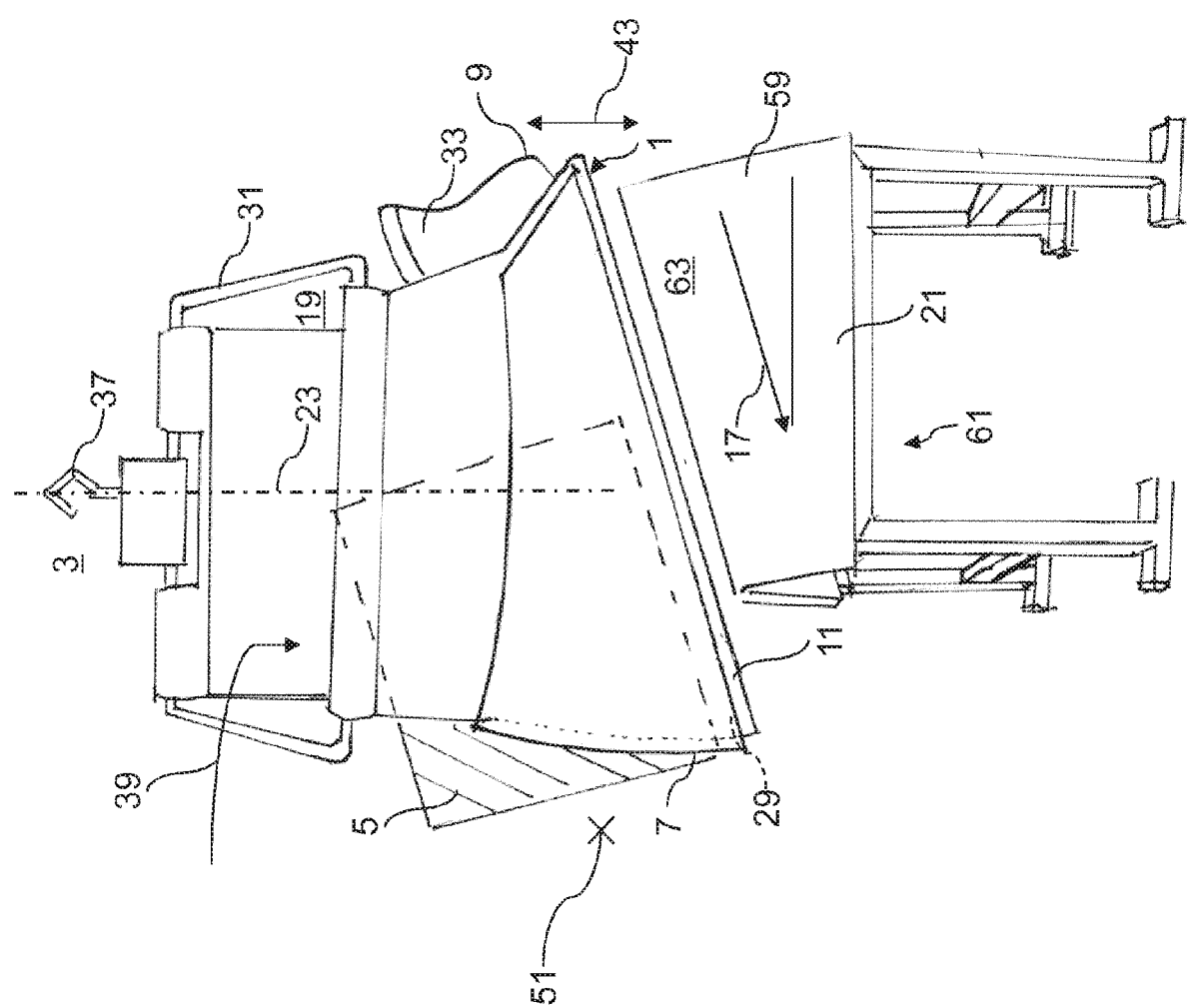
FIG. 6 shows a view of an article container interacting with a pusher dog mechanism, viewed against a direction of movement.
Figure 7:
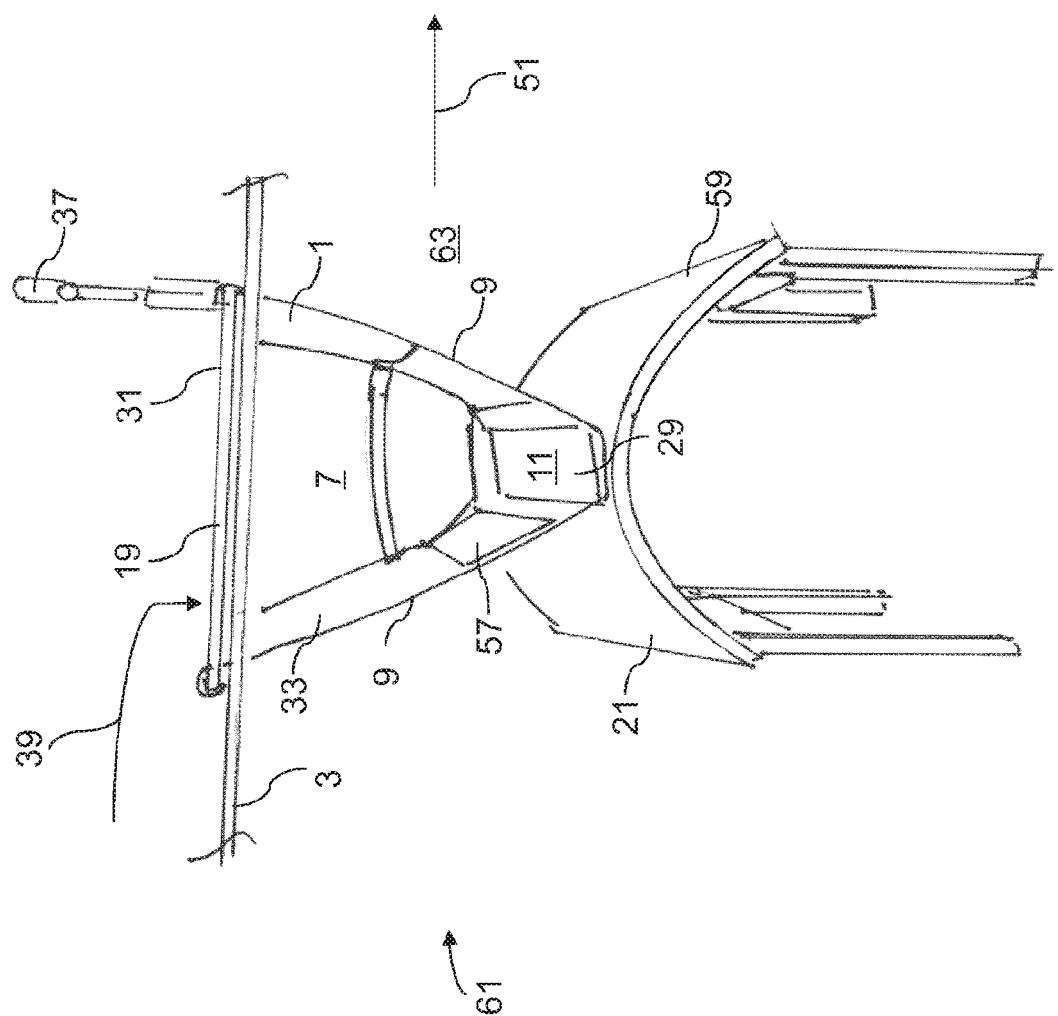
FIG. 7 shows a view of the article container shown in FIG. 6 together with the pusher dog mechanism transverse to the direction of movement.

The FIGS. 6 and 7 show another exemplary embodiment of an article container 1 interacting with a pusher dog mechanism 21. In FIG. 6 the article container 1 moves along a conveyance path 63 into the image plane and in the perspective of the FIG. 7 parallel to the image plane from left to right. The pusher dog mechanism 21, the article container 1 and an overhead conveying device 3, which is merely schematically indicated in FIG. 7, are part of a conveying arrangement 61. The above figures will also be referenced and only the differences will be elaborated on below.

In contrast to the first exemplary embodiment the article container 1 is emptied by means of a flush contact with the pusher dog mechanism 21 provided as an installable table, which can be produced upon a moving past. The pusher dog mechanism can also be formed and/or permanently installed as an inclined plane. The installation and positioning of the pusher dog mechanism 21 can thus be installed independent of a rail of the overhead conveying device 3, on which the hook 37 is conveyable. The pusher dog mechanism 21 can be positioned and/or installed freely along the conveying path. In this case, the installation is done in such a way that a collision of the article container 1 with an inclined surface 59 of the pusher dog mechanism 21 is generatable in a targeted manner upon a moving past. In this way the bottom 11 is dislocatable directly from its transport position into the discharge position shown in FIG. 6.

In order to support a targeted dislocation by means of the flush contact, in particular a grinding along the pusher dog mechanism 21, the bottom 11 can comprise, in particular be tentered by, a wire frame. Alternatively or additionally the bottom 11 can also comprise a stiffening plate. Upon a moving onward, there is a relocation into the transport position upon leaving the pusher dog mechanism 21. To that end the surface 59 is provided ascending and then descending again, viewed in the direction of movement 51. In particular, the surface 59 is additionally inclined sideways to the direction of movement 51, in particular with the discharge incline 17, which descends from the top right to the bottom left, viewed in the alignment of the FIG. 6. The pusher dog mechanism 21 is therefore lower at a side at which the discharge takes place than at a side opposite to the former. In this way a lateral discharge of the article 5, viewed relative to the direction of movement 51, can be done. Alternatively, the article 5 can be discharged in or against the direction of movement 51.

In order to achieve the effect described above for dislocating the bottom 11 via a direct flush contact with the pusher dog mechanism 21, the latter can be disposed in the conveying path 63, in particular in such a way that the surface 59 collides with the bottom 11 in order to dislocate the latter. A retrofitting can simply be done.

As can be seen in FIG. 7, which shows the article container 1 with the vertical opened side 7 facing the observer, the surface 59 can have a curved course, preferably a course curved in the shape of a parabola, in particular one that is curved upward in the shape of a parabola in the direction of movement 51 and preferably descending transversely to the direction of movement as well as toward the vertical opened side 7. To adjust the dislocation of the bottom 11, the pusher dog mechanism 21 can comprise an in particular hydraulically actuatable height adjustment. Preferably also the incline of the surface 59 can be influenced by means of the height adjustment, in particular transversely to the direction of movement 51. As can be seen in FIG. 6, the material 33 is flexible (non-rigid) at least in some regions, so that a precise dislocation of the bottom 11 can be done, wherein the article container 1 seizes swinging before, during and after the flush contact with the pusher dog mechanism 21. In this way large and small articles 5 can be discharged in a controllable and safe manner.

Figure 8:
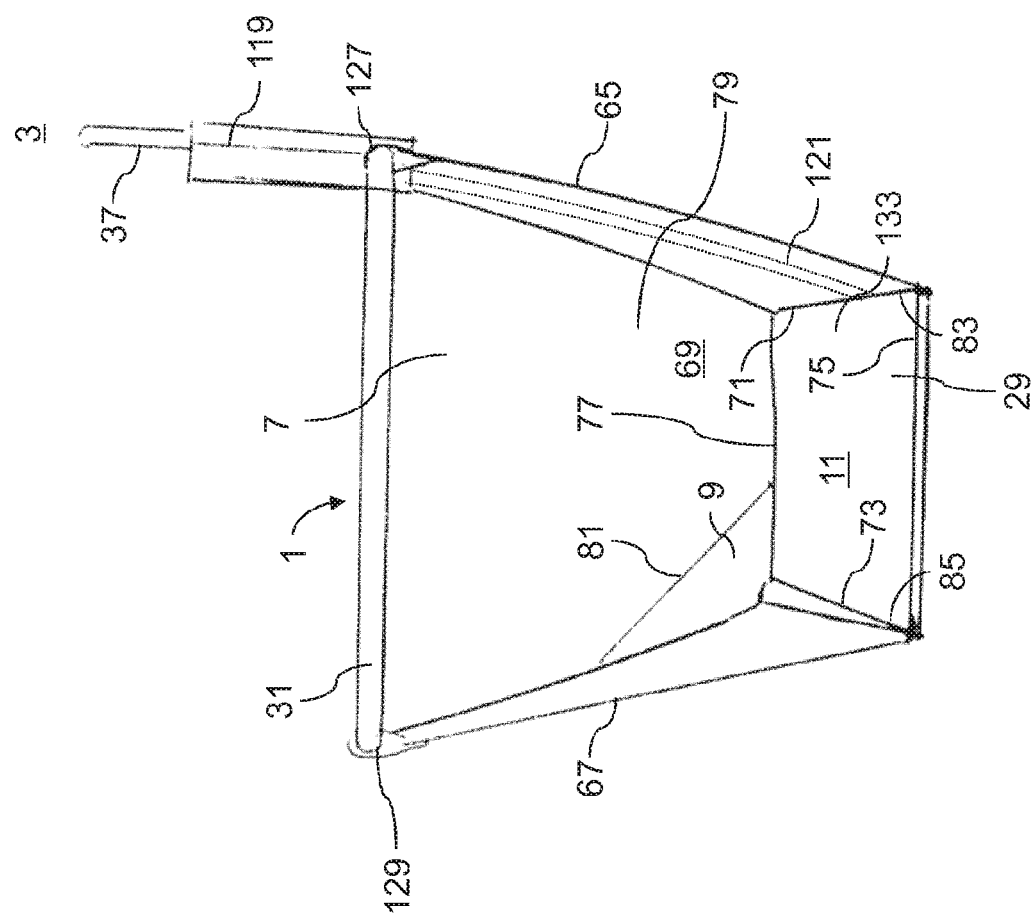
FIG. 8 shows a three-dimensional view onto an unloaded article container in an open position, in a third embodiment from the lateral top into a loading and unloading opening.

FIG. 8 shows an oblique three-dimensional side view from the lateral top of another article container 1. What can be seen is the view through a loading and/or unloading opening 79 into a storage space 69 of the article container 1. The storage space 69 remains between the bottom 11, a front wall 65, a rear wall 67 and a side wall stop 81 arranged opposite the loading and/or unloading opening 79.

The side wall stop 81 serves as a lock for the article 5 transportable in the storage space 69. The side wall stop 81 is in the present case formed as a triangle and is adjoined by a second end edge 77 of the bottom 11 and, from there, extends vertically upward while tapering off. The side wall stop 81 is also positioned at the bottom 11 and at the rear wall 67. Alternatively it is also conceivable to position the side wall stop 81 at the bottom 11 and the front wall 65 and/or at both walls 65 and 67 and/or to provide the former all over between the frame 31, the bottom 11, the front wall 65 and the rear wall 67. The frame 31 is preferably designed rectangular-shaped.

The bottom 11 merges into the front wall 65 at a first longitudinal edge 71. Accordingly, the bottom 11 merges into the rear wall 73 at a second longitudinal edge 73. Preferably the first longitudinal edge 71 is formed as a first folding edge 83 and the second longitudinal edge 73 is formed as a second folding edge 85. At the folding edges 83 and 85 the front wall 65, rear wall 67 and the bottom 11 can be folded and/or deviated against one another. The frame 31 is deviatable relative to a suspended support 119 along a drag bearing 127. Opposite the drag bearing 127 the frame 31 comprises another drag bearing 129, here comprising a loop formed by folding down and/or a fabric conduit for the articulated accommodation of a leg of the frame 31. By means of the other drag bearing 129 the rear wall 67 can be deviated relative to the frame 31. It is apparent that by means of the drag bearing 127 the other drag bearing 129 as well as the first folding edge 83 and the second folding edge 85 a four-bar linkage is formed, by means of which the article container 1 shown in FIG. 8 can be adjusted and/or is adjustable between an opened position shown in FIG. 8 and a closed position shown for example in FIG. 10.

Opposite the second end edge 77 the bottom 11 of the article container 1 comprises a first end edge 75. At the first end edge 75 the bottom 11 is adjoined by the loading and/or unloading opening 79. Laterally the loading and/or unloading opening 79 is limited by the front wall 65 and rear wall 67.

Figure 9:
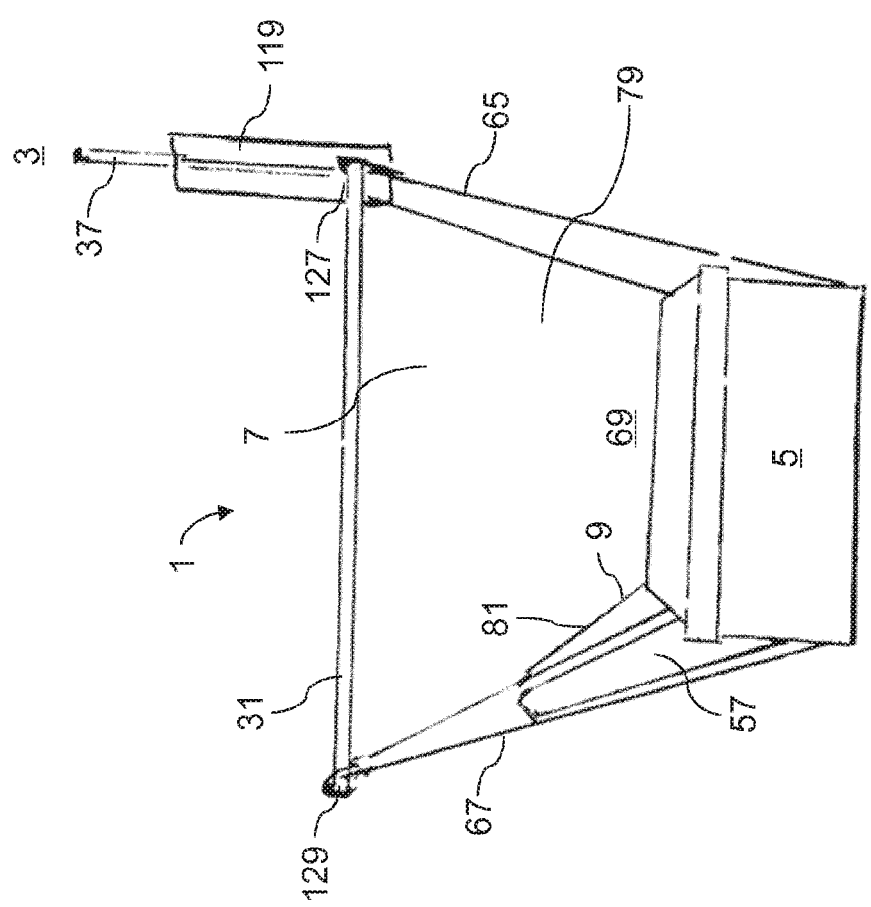
FIG. 9 shows the view of the article container shown in FIG. 8, but in contrast loaded with an article.

FIG. 9 shows the article container 1 shown in FIG. 8, but loaded with an article 5. In FIG. 9, too, the article container 1 is shown in the opened position, wherein the 5 is accessible via the loading and/or unloading opening 79. Further, in FIG. 9 a planking 57 can be seen, which in this exemplary embodiment serves for stiffening the rear wall 67. The bottom 11 can also comprise a planking 57, on which the article 5 can be rested without essential deformation of the bottom 11, as marked in FIG. 9.

FIG. 10 shows the article container 1 shown in the FIGS. 8 and 9 in a lateral view and in the closed position. It can be seen that to that end the frame 31 is deviated, in the present case folded down, by means of the drag bearing 127. In this way the article container 1 can be folded up along the folding edges 83 and 85, wherein a volume of the storage space 69 is reduced to a minimum, preferably to a volume of zero.

FIG. 11 shows the view of the article container 1 shown in FIG. 10, also in the closed position, but loaded with a comparatively small article 5. It can be seen that due to the volume of the article 5 the storage space 9 in the closed position is only partially reduced. More precisely, the storage space 69 in the closed position comprises a volume adjusted to the article 5, wherein the article 5 is held, clamped and/or fixed in a friction fit in the storage space 69 due to a weight of the article 5 as well as of the plankings 57 and/or of the frame 31. Alternatively or additionally in this case the flexible material 33 can deform and/or adapt to a contour of the article 5 and cause a form fit 131 between the flexible material 33 and the article 5. In this way the article 5 can be held particularly well in the storage space 69.

FIG. 12 shows the view of the article container 1 shown in the FIGS. 10 and 11, but loaded with a larger article 5. FIG. 12 shows the article container 1 in its closed position as well, wherein due to the larger volume of the article 5 the storage space 69 is increased accordingly and is thereby adapted to the volume of the article 5.

FIG. 13 shows the view of the article container 1 shown in the FIGS. 10 to 12, but in contrast in the opened position. As indicated by means of a curved arrow 125 in the FIGS. 10 to 13, the frame 31 is to that end deviated from a drooping position shown in FIG. 10 into an approximately horizontal position. It can be seen that the storage space 69 is thereby increased to a maximum volume. In the opened position a loading and unloading of the article container 1 can be done in a simple manner.

As can be seen in FIG. 13, the article container in its opened position preferably comprises a trapezoid longitudinal section, wherein the bottom 11 is arranged parallel to the frame 31. Preferably the longitudinal section of the article container 1 in the opened position is isoscelesly trapezoid. Alternatively, however, it is also conceivable that the longitudinal section in the opened position forms a general quadrangle, a rectangle or a square. An isoscelesly trapezoid design in FIG. 13 has proven particularly advantageous, wherein the storage space 69 widens upward toward the frame 31. In such a design the loading and unloading can be done in a particularly simple manner, wherein the front wall 65 and the rear wall 67 interfere comparatively little. Further, in this design it is possible to alternatively load the article container 1 in a particularly simple manner from the top through the frame 31.

Figure 14:
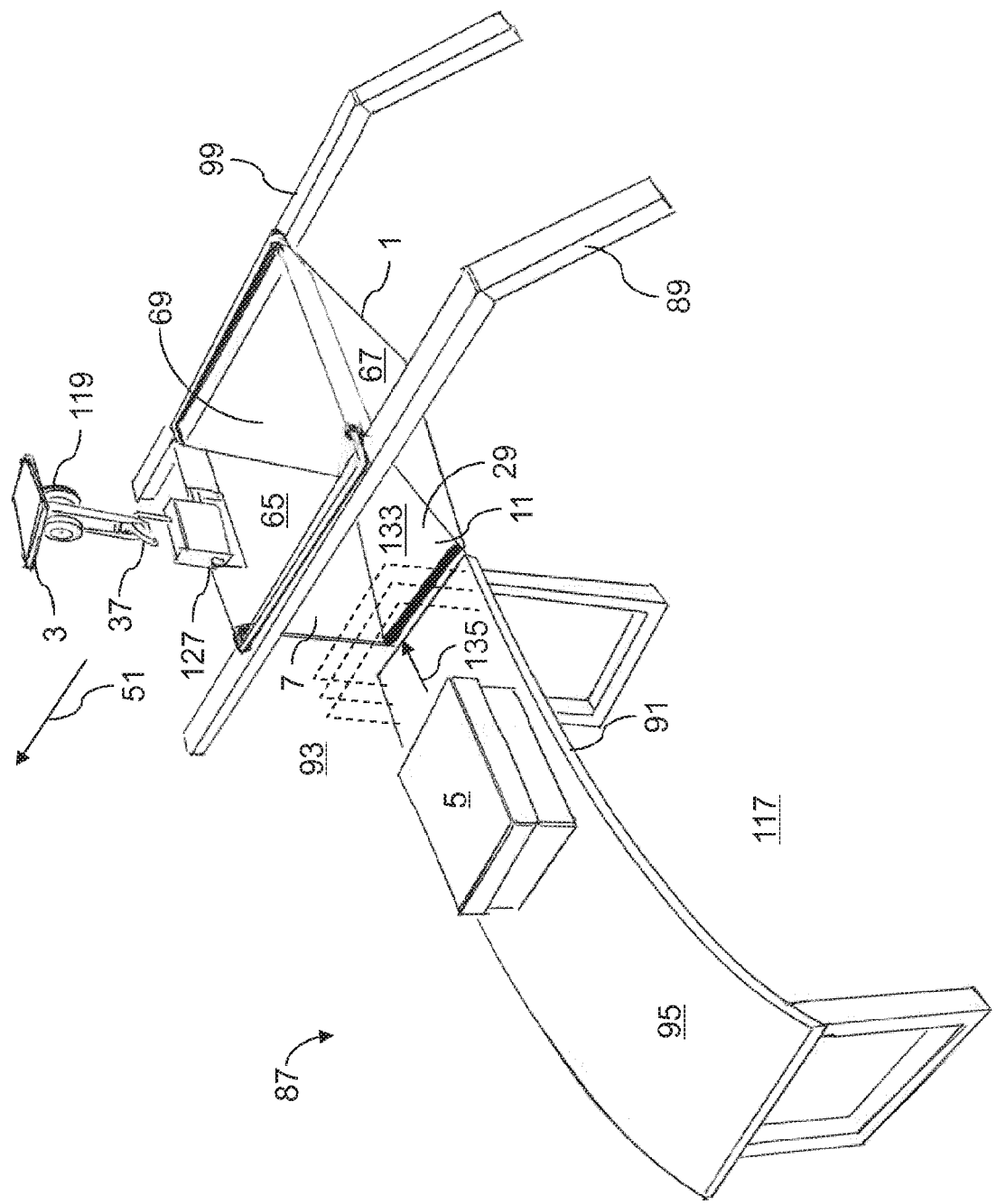
FIG. 14 shows a three-dimensional oblique lateral-to-front top view of the article container shown in the FIGS. 8 to 13 in a loading station.

FIG. 14 shows the article container 1 shown in the FIGS. 8 to 13 from the oblique lateral-to-rear top in a loading station 87.

In the loading station 87 the article container 1 has the opened position. The latter can for example be caused by means of an opening device 89 of the loading station 87. In the present case, the opening device 89 is part of a guide profile 99 interacting with the frame 31. More precisely, upon entry (from right to left—as indicated with the help of the arrow 51) into the loading station 87 the frame 31 approaches an obliquely cranked part of the guide profile 99 and is thereby deviated around the drag bearing 127. Thereby the article container 1 is adjusted from the closed position shown in FIG. 10 into the opened position shown in FIG. 13.

According to a first embodiment the loading station 87 comprises only a loading device 91, which is in the present case formed as a table. The table of the loading device 91 comprises a surface forming a working plane 95.

According to a second design the loading station 87 can comprise the loading device 91 and a feeding device 93 indicated merely by means of dashed lines and the reference number 93. The feeding device 93 can for example comprise a pusher, which dislocates the article 5 into the storage space 69 of the article container 1. The loading device 91 in turn, is formed as a table, which forms at one surface the working plane 95.

According to a third design the loading station 87 can comprise a feeding device 93, which comprises for example a motorized conveyor mechanism, such as a belt conveyor, which conveys the article 5 into the storage space 69 of the article container 1. The feeding device 93 forms the working plane 95 by its conveying plane.

According to a fourth design (not depicted in more detail) the loading station 87 can comprise a feeding device 93 instead of the loading device 91. The feeding device 93 can for example comprise a robot, which dislocates the article 5 into the storage space 69 of the article container 1. In this case the table is obsolete, wherein the working plane 95 is formed as an imaginary working plane, for example defined by a trajectory of movement of the robot not depicted in more detail, for moving the article 5 into the storage space 69.

According to all embodiments the working plane 95 is disposed preferably in alignment, particularly preferably slightly above a sliding surface 29 of the bottom 11. According to the first and second embodiment, to load the article container 1 the article 5 can slide along the working plane 95 and the sliding surface 29 of the bottom 11, which is symbolized in FIG. 14 by means of a first arrow 135.

Figure 15:
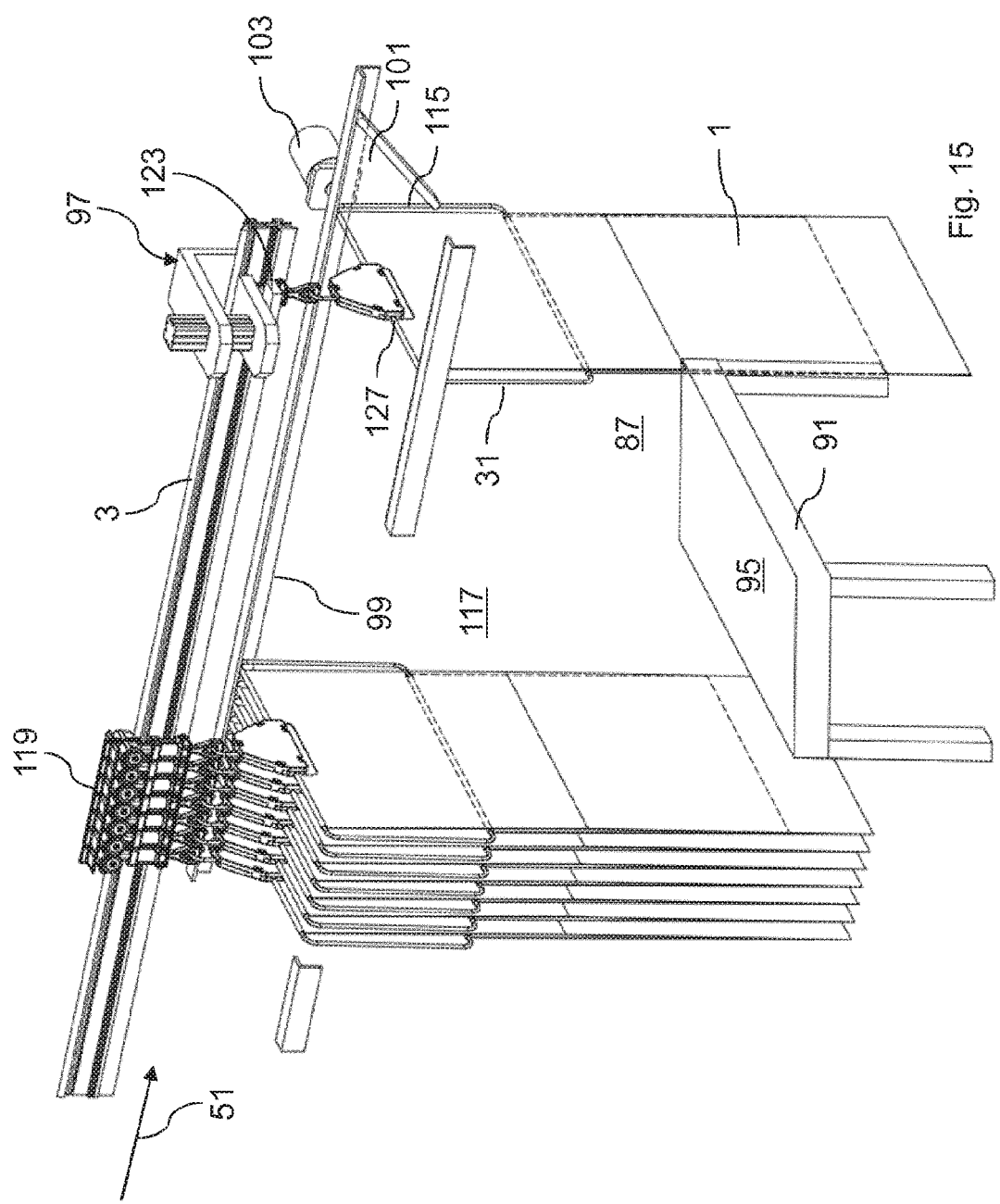
FIGS. 15 to 17 each show a three-dimensional oblique view of another article container from the lateral-to-rear top in another loading station to illustrate different phases of a loading of the article container with an article.
Figure 16:
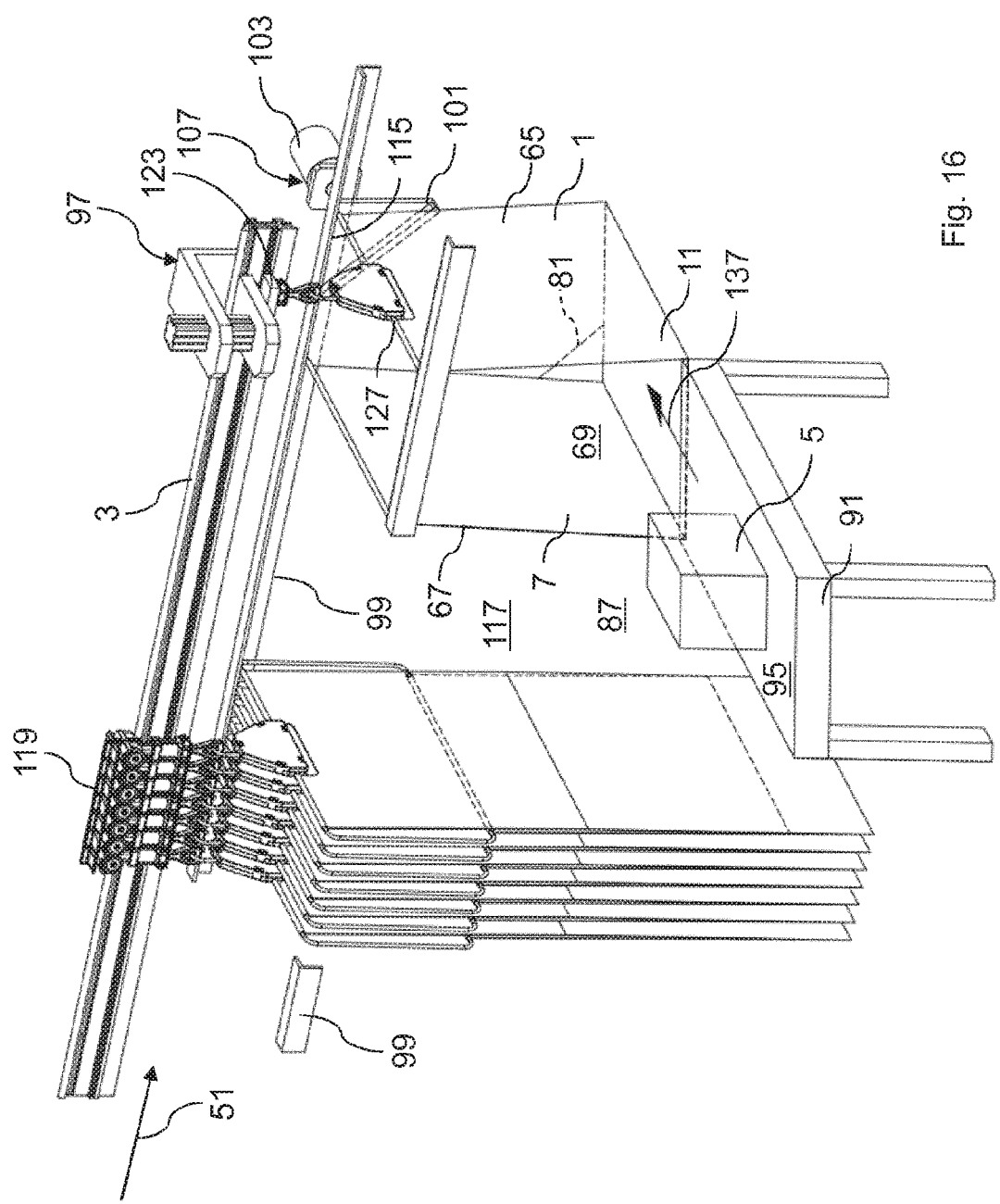
Figure 17:
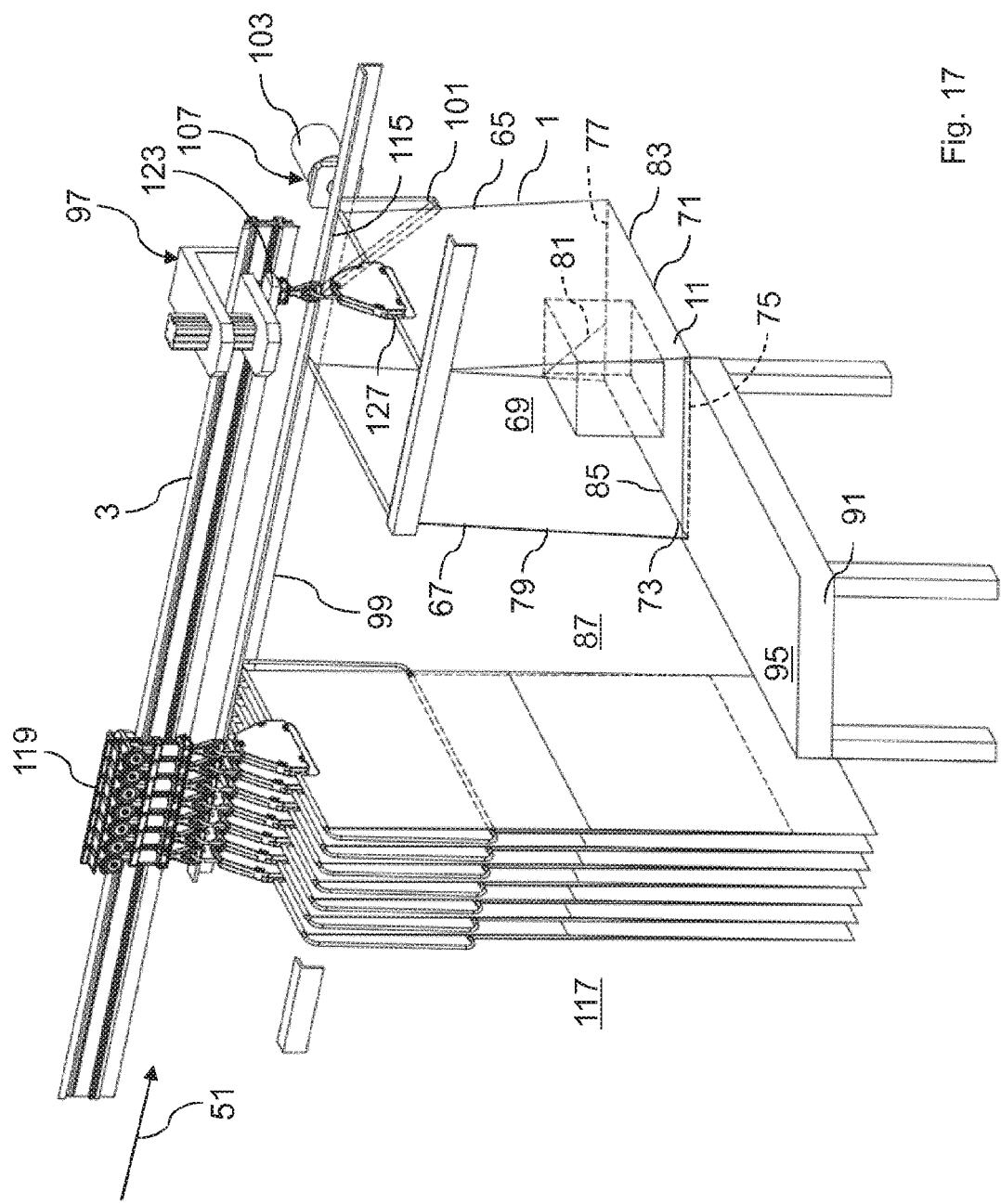

The FIGS. 15 to 17 show another exemplary embodiment of an article container 1 in a loading station 87. What is depicted are different phases of the loading of the article container 1 with the article 5. The FIGS. 15 to 17 are referenced equally below, unless explicitly stated otherwise.

The loading station 87 and the article container 1 are part of an overhead conveying system 117 depicted only partially. The overhead conveying system 117 comprises the overhead conveying device 3. The overhead conveying device 3 can for example comprise a conveyor medium, which is known in principle and is therefore not elucidated in detail, for example a belt endlessly revolving along a conveyor rail. By means of the overhead conveying device 3 the suspended supports 119, and via these the article container 1, can be conveyed. If applicable, this can be done along the loading station 87 by means of the guide profile 99. As can be seen in the FIGS. 15 to 17, the guide profile 99 can be provided unilaterally or, if applicable, bilaterally for guiding the frame 31. For purposes of better illustration a side of the guide profile 99 is merely partially depicted in the FIGS. 15 to 17. The guide profiles 99 can extend along the entire overhead conveying device 3 or optionally merely along the loading station 87 in order to save material.

The FIGS. 15 to 17 show one of the article containers 1 relative to the loading station 87 and/or the overhead conveying device 3 in a provisioning position (loading position). The provisioning position can be induced and/or maintained by means of a locking device 97. By means of the locking device 97 the article container 1 can to that end be fixed and/or braked relative to the overhead conveying device 3, so that the latter remains in the provisioning position during the loading operation.

As can further be seen in the FIGS. 15 to 17, a plurality of the article containers 1 are transported with the help of the overhead conveying system 117 by means of the overhead conveying device 3. In an exemplary manner, seven other empty article containers 1, each of which is in the closed position, are marked in the drawing in a buffer prior to an entry into the loading station 87. As soon as the previous article container 1 has been loaded, a next article container 1 moves up and can be loaded with another article 5.

As can be seen in FIG. 15, the article container 1 is in the closed position before the loading. In this case, the frame 31 is folded down, i.e. it is located approximately in a vertical alignment.

As can be seen in FIG. 16, the article container 1 is already deviated into its opened position. To that end a bag opening flap 101 is deviated around an angle starting from a position shown in FIG. 15 into another position shown in FIG. 16. The actuating and/or deviating of the bag opening flap 101 between a first flap position and a second flap position is done by means of a drive 103. In the first flap position (FIG. 15) the article container 1 is in the closed position. In the second flap position (FIG. 16, 17) the article container 1 is in the opened position. The drive 103 can be a stepper motor and/or any other mechanical drive. The drive 103 and the bag opening flap 101 are part of an opening device 107 for adjusting the article container 1 from its closed position, which is shown in FIG. 15, into its opened position, which is shown in FIG. 16. The opening device 107 comprises an actuation device for opening the article container 1, in which an actuation device moves the frame 31 of the article container 1 between an initial position and a deviation position. In the initial position, depending on the load, the frame 31 is disposed approximately vertical to oblique and in the deviation position approximately horizontal.

According to the embodiment shown the actuation device comprises a bag opening flap 101 adjustable via the drive 103 between a first position, shown in FIG. 15, and a second position, shown in the FIGS. 16 and 17.

The bag opening flap 101 comprises a guide crosspiece 115. In the illustration of FIG. 15, i.e. in the closed position of the article container 1, the latter is located in front of the folded-down frame 31. In the illustration according to FIGS. 16 and 17, i.e. in the opened position of the article container 1, the frame 31 is located between the guide crosspiece 115 and the guide profile 99. Depending on the driving torque of the drive 103, it is possible that the frame 31 is thereby fixed in a friction fit between the guide crosspiece 115 of the bag opening flap 101 and the guide profile 99. As shown in the FIGS. 16 and 17, therefore, in the opened position of the article container 1 the guide crosspiece 115 rests against the frame 31 and holds the latter in an essentially horizontal position.

In FIG. 15 the article container 1 is still in the closed position. In FIG. 16 the container 1 is in its opened position by means of a deviating of the frame 31 into a horizontal position, wherein in FIG. 16 an article 5 is on standby to be loaded. The latter is pushed into the storage space 69 along a second arrow 137. In this case, the bottom 11 forms a receiving surface 133 ending in the loading and/or unloading opening 79, on which the article 5—as depicted in FIG. 17—can be stored until the readjusting of the article container 1 from the opened position, shown in the FIGS. 16 and 17, into its closed position, and which in particular defines the sliding surface 29. In comparison to the FIGS. 10 to 12 it can be seen that the bottom 11 forms the essentially horizontal receiving surface 133 only in the opened position. In the closed position, shown in the FIGS. 10 to 12, the bottom 11 is drooping vertically and can in this case form a vertical contact surface, against which the article 5 can be applied during the transport, if applicable.

FIG. 17 accordingly shows the article container 1 in the loading station 87 with the accommodated article 5. In FIG. 17 the article 5 is thus already in the article container 1, wherein the latter is still in the opened position. By a redeviating of the bag opening flap 101 from the actuation position, shown in the FIGS. 16 and 17, into the initial position, shown in FIG. 15, the article container 1 can be brought from the opened position into the closed position, wherein in this case the article 5 is clamped in the storage space 65, as illustrated for example also in the FIGS. 11 and 12.

To load an article container 1 with an article 5, article containers 1 are transported on the overhead conveying device 3 to the loading station 87 and sequentially provisioned in the provisioning position in front of the loading device 91 or the feeding device 93.

The article container 1 to be loaded can be stopped at a provisioning position and, there, fixed in its position with the help of the locking device 97, if applicable. The article container 1 is still in the closed position.

In a first step the article container 1 is adjusted by means of the opening device 107 from the closed position, in which the storage space 69 is inaccessible and/or of reduced volume, into the opened position, in which the storage space 69 is accessible. This is done, according to this exemplary embodiment, by actuating the bag opening flap 101 from the first flap position into the second flap position. In the second flap position the frame 31 is in the deviation position and is maintained in the deviation position by the bag opening flap 101 in the opened position of the article container 1. Further, in the deviation position the frame 31 can be applied against the guide profile 99, whereby a stabilization of the opened article container 1 is achieved and the loading operation can be done in a particularly reliable manner.

Subsequently in a second step one or several articles 5 is brought from the loading device 91 or the feeding device 93 into the storage space 69 of the article container 1, which has been adjusted into the opened position. The working plane 95 at the loading device 91 or at the feeding device 93 is essentially in alignment with the bottom 11 of the article-container 1 or extends slightly above the bottom 11 of the article container 1.

After the loading of the article container 1 with at least one article 5 the article container 1 is released, provided that there is a locking device 97, and a driving force is impinged on it and the frame 31 slides along the guide crosspiece 115 (still adjusted into the second flap position). The frame 31 leaves the guide crosspiece 115 as a consequence of the conveying movement and the frame 31 deviates downward by itself, so that the loaded article container 1 is closed—the article container 1 is in the closed position and holds the article between the front wall 65, rear wall 67 and bottom 11.

After the article container 1 has left the loading station 87, the bag opening flap 101 is adjusted from the second flap position into the first flap position. The bag opening flap 101 is again on standby for the next article container 1.

Figure 23:
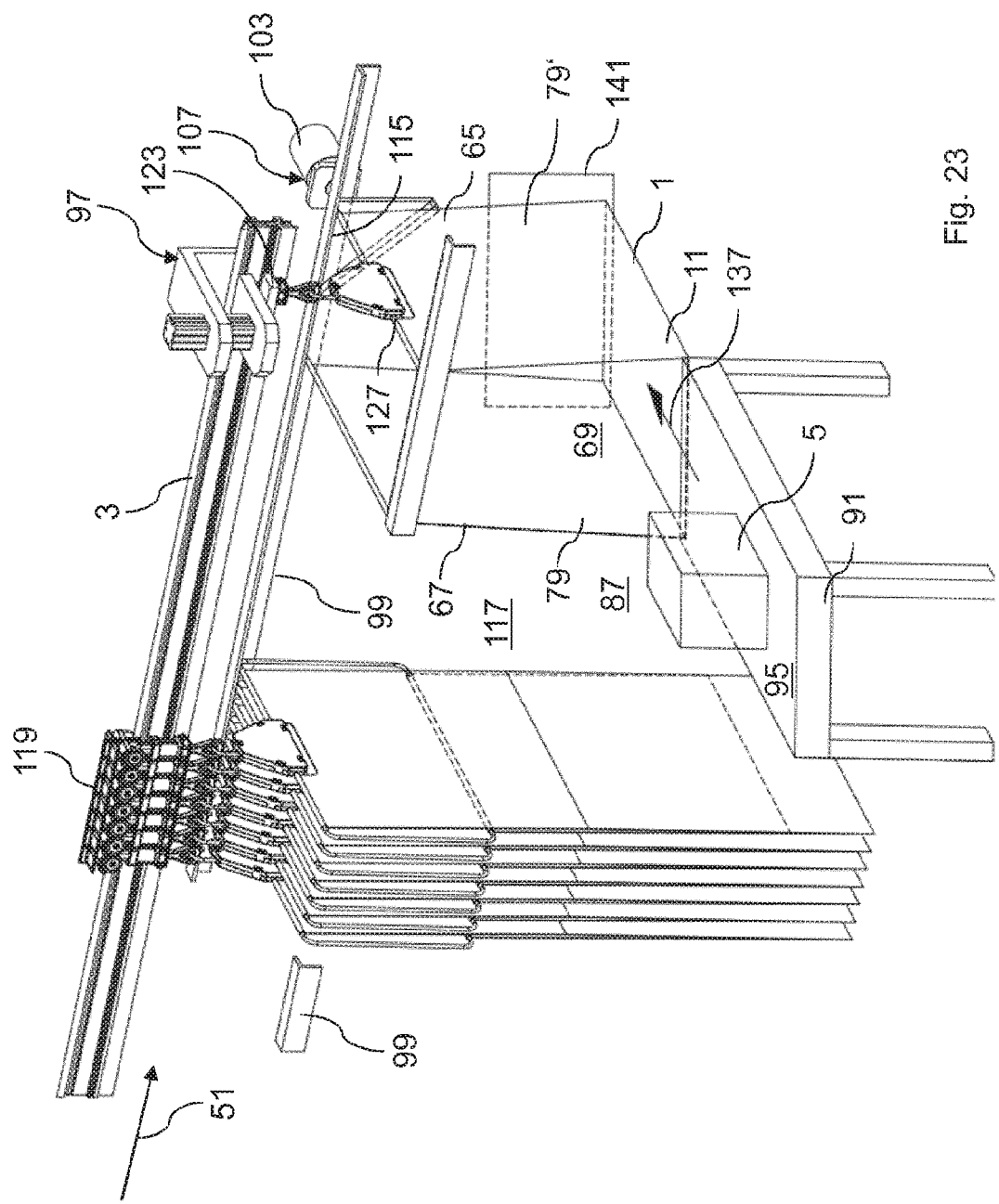
FIG. 23 shows another loading station analog to the loading station shown in the FIGS. 15 to 17, which in contrast comprises a stationary wall for preventing an accidental sliding through of the load.

Alternatively, the adjusting of the article container 1 from the closed position, in which the storage space 69 is inaccessible and/or of reduced volume, into the opened position, in which the storage space 69 is accessible, can be done by an operator (not depicted) working at the loading station 87. In this case also the frame 31 is adjusted, in particular deviated. A separate opening device 107 is therefore obsolete, FIG. 23 shows another loading station 87 analog to the loading station shown in the FIGS. 15 to 17, which in contrast comprises a stationary wall 141 for preventing an accidental sliding through of the load. The differences are elucidated in more detail below and, as to the rest, reference is made to the FIGS. 15 to 17.

FIG. 23 shows the article container 1 in the loading station 87 in the opened position and therefore ready to be loaded, wherein the article 5, like in the illustration of FIG. 16, has not yet been inserted into the storage space 69. The article container 1 is therefore in the provisioning position. It can be seen that the loading station 87 comprises a stationary wall 141 opposite the loading and/or unloading opening 79, if the article container 1 is in the provisioning position depicted. The article 5 can stop against this stationary wall 141 of the loading station 87 in a loading operation along the direction of the second arrow 137. In this way an accidental sliding through, during which the article 5 would drop out of the article container 1 again, can be prevented with certainty.

FIG. 23 further shows an article container 1, which is formed in contrast to the previous figures without the side wall stop 81. Such an article container 1 can be used particularly well in combination with the loading station 87 according to FIG. 23.

In this embodiment the article container 1 contains an opening delimited by the front wall 65 and rear wall 67 and adjoining the second end edge 77, which forms in particular a loading and/or unloading opening 79'. In this way it is possible that at a first side the article container 1 forms the loading opening 79 and at a second side the article container 1 forms the unloading opening 79' or vice versa.

Within the scope of the invention, however, it is also possible that the loading station 87 in accordance with the previous embodiments is equipped with a stationary wall and the article container 1 is formed with the side wall stop 81. Similarly, the unloading station 105, as described below, can comprise a stationary wall (not depicted) opposite the loading and/or unloading opening 79, against which the article 5 to be unloaded can be applied. In this way the article 5 can be aligned relative to the bottom 11, if applicable.

Figure 18:
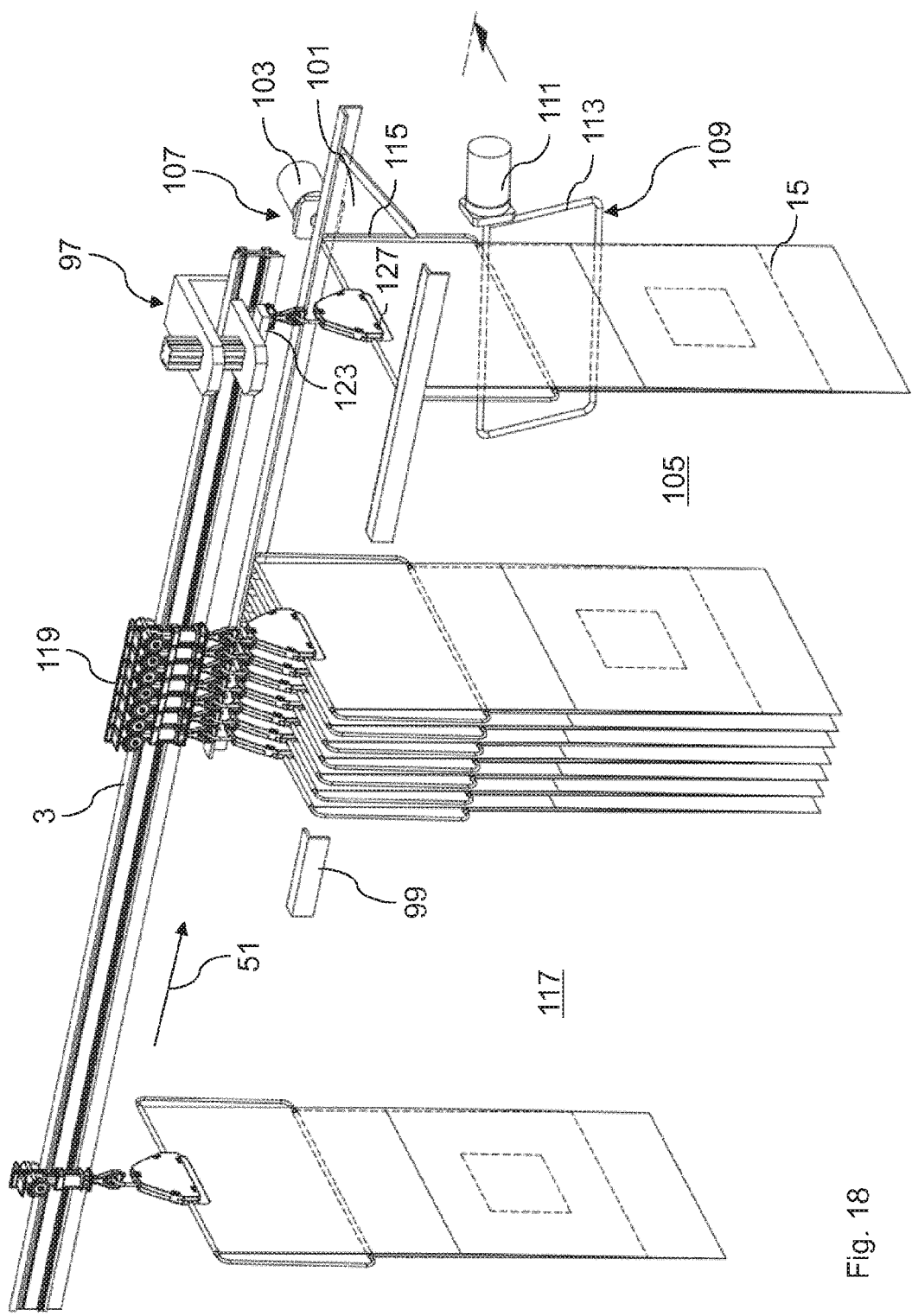
FIGS. 18 to 20 show the article container shown in the FIGS. 15 to 17, but in contrast in an unloading station to illustrate an unloading operation.
Figure 19:
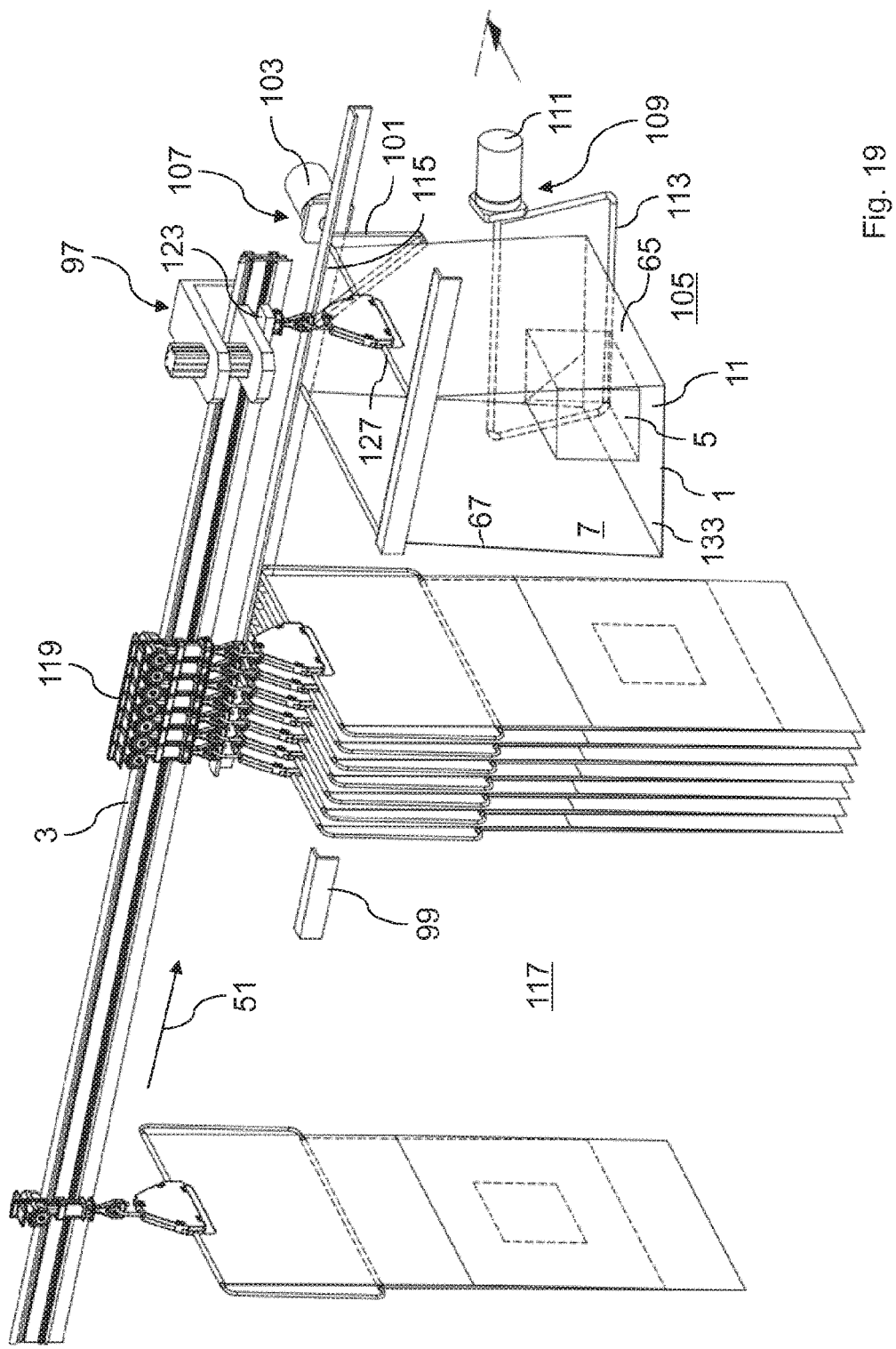
Figure 20:
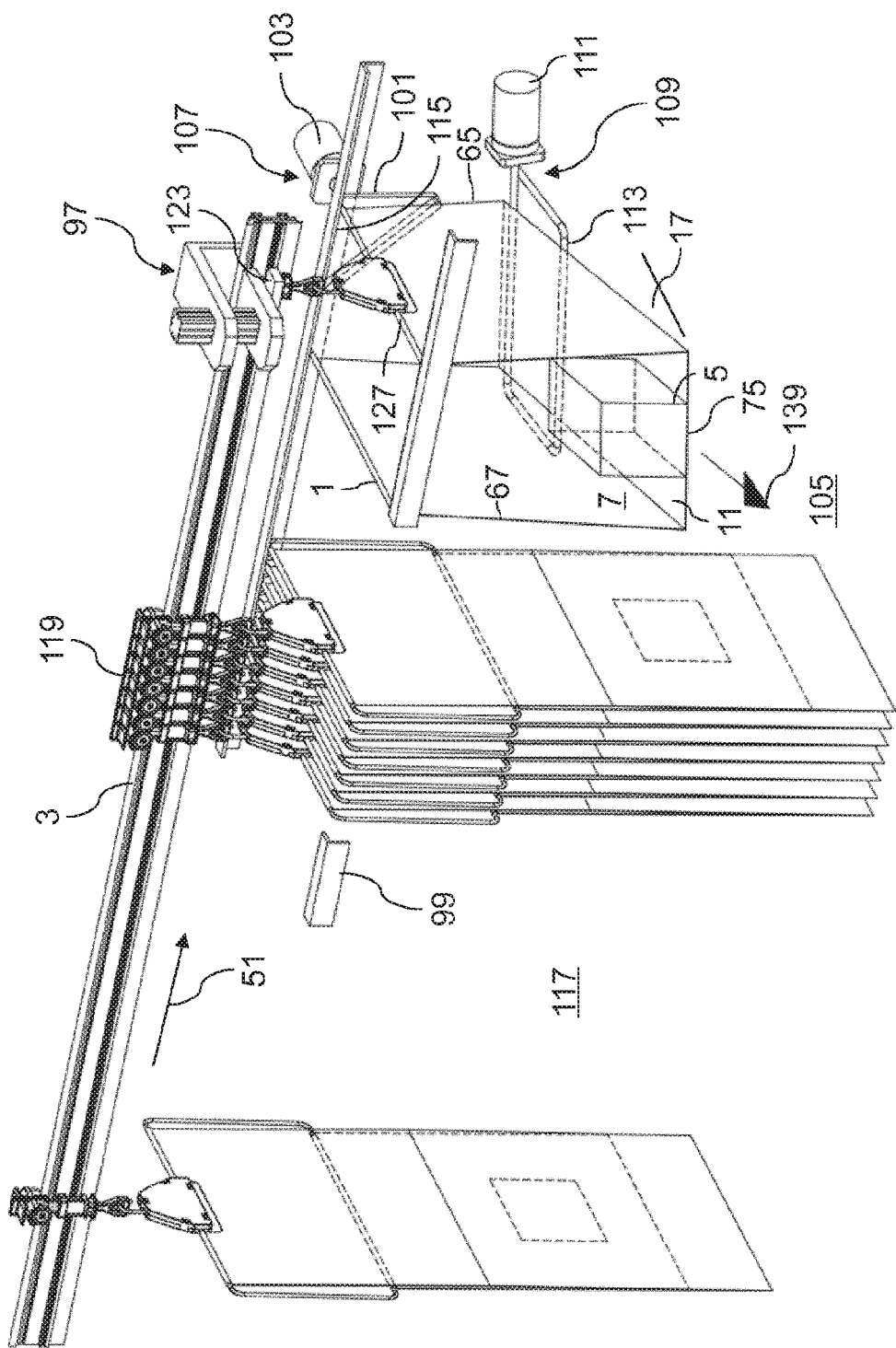

The FIGS. 18 to 20 show the article container 1 in an unloading station 105 of the overhead conveying system 117. The FIGS. 18 to 20 illustrate an unloading operation of the article container 1 in various phases. The FIGS. 18 to 20 are referenced collectively below, unless explicitly stated otherwise.

The unloading station 105 for unloading an article container 1 loaded with at least one article comprises an overhead conveying device 3 for transporting the article container 1 into the unloading station 105 and transporting the article container 1 out of the unloading station 105, an opening device 107 (discharge mechanism) for adjusting the article container 1 between a closed position, in which the article 5 is stowed or stowable in the storage space 69, and an opened position, in which the article 5 is accessible in the storage space 69, and an unloading device 109 for unloading the article container 1, which has been adjusted into the opened position. Reference is made to the description of the FIGS. 15 to 17. Further, the unloading station 105 comprises a locking device 97 for locking the suspended support 119 analog to the illustrations 15 to 17. The locking device 97 comprises a fixing plate 123, which can be brought in contact with the suspended support 119 and by means of which the suspended support 119 is fixable in a form and/or friction fit to the overhead conveying device 3. The fixing plate 123 can be dislocated and/or accordingly brought in contact with the suspended support 119 by means of a drive and/or actuation device not depicted in more detail.

The overhead conveying device 3 can for example comprise a conveyor medium, which is known in principle and is therefore not elucidated in detail, for example a belt endlessly revolving along a conveyor rail. By means of the overhead conveying device 3 the suspended supports 119, and via these the article container 1, can be conveyed. If applicable, this can be done along the unloading station 105 by means of the guide profile 99. As can be seen in the FIGS. 18 to 20, the guide profile 99 can be provided unilaterally or, if applicable, bilaterally for guiding the frame 31. For purposes of better illustration a side of the guide profile 99 is merely partially depicted in the FIGS. 18 to 20. The guide profiles 99 can extend along the entire overhead conveying device 3 or optionally merely along the unloading station 105 in order to save material.

The opening device 107 comprises an actuation device for opening the article container 1, in which an actuation device moves the frame 31 of the article container 1 between an initial position and a deviation position. In the initial position, depending on the load, the frame 31 is disposed approximately vertical to oblique and in the deviation position approximately horizontal.

According to the embodiment shown the actuation device comprises a bag opening flap 101 adjustable via the drive 103 between a first position, shown in the FIGS. 18, 21, and a second position, shown in the FIGS. 19, 20 and 22. In the first flap position the article container 1 is in the closed position. In the second flap position the article container 1 is in the opened position. If the article container 1 is in the provisioning position, i.e. optionally locked and positioned for unloading in the unloading station 105, the frame 31 is in the initial position and the bag opening flap 101 is in the first position, in which the frame 31 is applied against a guide crosspiece 115 of the bag opening flap 101.

FIG. 18 shows the article container 1 in a state loaded with the article 5, which is merely indicated my means of a dashed rhombus in FIG. 18. Further, other buffered article containers 1 as well as an approaching article container 1 entering into the buffer are depicted in the FIGS. 18 to 20.

FIG. 19 shows the article container 1 fixed in the unloading station 105, but which has already been brought into the opened position by means of the bag opening flap 101 of the opening device 107. It can be seen that the article 5 is thereby accessible through the loading and/or unloading opening 79. In order to make a reaching into the storage space 69 avoidable, the unloading station 105 shown in the FIGS. 18 to 20 comprises an unloading device 109. The unloading device 109 comprises a bag unloading device 113 actuatable by means of an unloading drive 111 between an initial position (FIGS. 18, 19, 21, 22) and an actuation position (FIG. 20). In the present case the bag unloading device 113 is designed as an arm deviatable by means of the unloading drive 111.

As can be seen in the FIGS. 18 to 20, the bag unloading device 113, in particular the arm, is disposed at a side of the article container 1 opposite the loading and/or unloading opening 79 and positioned in such a way that the bottom 11 can be unilaterally lifted by deviating the bag unloading device 113, in particular the arm. By deviating the arm of the bag unloading device 113 the bottom 11 of the article container 1 is unilaterally reached under. The bottom 11 can therefore be unilaterally lifted. By the unilateral lifting opposite the loading and/or unloading opening 79 the second end edge 77 opposite the loading and/or unloading opening 79 is positioned higher than the first end edge 75, which adjoins the loading and/or unloading opening 79. In this way the discharge incline 17 of the bottom 11 marked in FIG. 20 is produced, so that the article 5 slides out of the article container 1 by itself in the direction of an arrow 139. The sliding motion takes place across the bottom 11 and/or the sliding surface 29 of the bottom 11. In comparison the bottom 11 in the FIGS. 18 and 19 can form the storage incline 15 toward the side wall stop 81.

In the FIGS. 18 to 20 it can also be seen that the article containers 1 are conveyed on the overhead conveying device 3 sequentially and separately to the unloading station 105. The article containers 1 can be backed up in front of the unloading station 105 in the buffer device, as shown in the FIGS. 18 to 20. Subsequently, the article containers 1 are, again separately, conveyed to the unloading station 105 and, there, into a provisioning position (unloading position). The separation of the article containers 1 is done by the buffer device. Such a buffer device is known from the prior art and is therefore not described in more detail.

The FIGS. 21 and 22 show a detailed view of the opening device 107 and unloading device 109 shown in the FIGS. 18 to 20. The interaction of the opening device 107 and the unloading device 109 for the unloading of the article container 1 is elucidated in more detail below. First the article container 1 enters into the unloading station 105 and is fixed in the unloading position by means of the locking device 97. The unloading position of the article container 1 is shown in the FIGS. 21 and 22. In FIG. 21 the article container 1 is still in its closed position and is loaded with an article 5 not depicted. By a deviating of the bag opening flap 101 the opened position of the article container 1 shown in FIG. 22 is caused. In this case the storage space 69 and the article 5, which is inside it but not depicted, is accessible. After an actuation of the bag opening flap 101 there is an actuation of the bag unloading device 113. As can be seen clearly in the FIGS. 21 and 22, a rod of the arm of the bag unloading device 113, which is located radially outside a deviation axis defined by the unloading drive 111, can unilaterally reach under the bottom 11. To lift the bottom 11 the former stops against the bottom 11 from below and lifts the latter until the desired discharge incline 17 has been produced. This position is shown in FIG. 20.

To unload, loaded article containers 1 are transported to the unloading station 105 on the overhead conveying device 3 and sequentially provisioned in the provisioning position in front of the unloading device 109. The article container 1 to be unloaded can be stopped at the provisioning position (unloading position) and, there, fixed in its position with the help of the locking device 97, if applicable. The loaded article container 1 is still in the closed position (FIGS. 18, 21).

In a first step the preferably stopped and optionally locked article container 1 is adjusted by means of the opening device 107 from the closed position, in which the storage space 69 is inaccessible and/or of reduced volume, into the opened position, in which the storage space 69 is accessible (FIGS. 19, 22). This is done, according to this exemplary embodiment, by actuating the bag opening flap 101 from the first flap position into the second flap position. In the second flap position the frame 31 is in the deviation position and is maintained in the deviation position by the bag opening flap 101 in the opened position of the article container 1. Further, in the deviation position the frame 31 can be applied against the guide profile 99, whereby a stabilization of the opened article container 1 is achieved and the unloading operation can be done in a particularly reliable manner.

Subsequently, in a second step the bottom 11 is inclined from a transport position, in which the article 5 is stored in the storage space 69, into a discharge position, in which the article 5 is discharged from the storage space 69 (FIG. 20). In the discharge position a rear region of the bottom positioned opposite the loading and/or unloading opening 79 is positioned higher than a front region of the bottom, and the article 5 slides out of the article container 1.

If the article container 1 is to be conveyed out of the unloading station 105 after unloading, the bottom 11 is moved from the discharge position back into the transport position. This is done according to this exemplary embodiment by actuating the bag opening flap 101 from the second flap position into the first flap position (while the article container 1 stands still). The article container 1 is released, provided that there is a locking device 97, and a driving force is impinged on it and the frame 31 slides along the guide crosspiece 115 (still adjusted into the second flap position). The frame 31 leaves the guide crosspiece 115 as a consequence of the conveying movement and the frame 31 is readjusted and/or deviates downward by itself from the deviation position into the initial position, so that the article container 1 is closed—the unloaded article container 1 is in the closed position.

After the article container 1 has left the unloading station 105, the bag opening flap 101 is adjusted from the second flap position into the first flap position. The bag opening flap 101 is again on standby for the next article container 1.

Alternatively, the adjusting of the article container 1 from the closed position, in which the storage space 69 is inaccessible and/or of reduced volume, into the opened position, in which the storage space 69 is accessible, can be done by an operator (not depicted) working at the unloading station 105. In this case also the frame 31 is adjusted, in particular deviated. A separate opening device 107 is therefore obsolete.

As can be seen in FIG. 8, it is possible that the flexible (non-rigid) material 33 of the article container 1 comprises electrically conductive properties, in particular electrically conductive fibers 121. These can be woven into the flexible material 33 at a distance of between 1 and 15 mm, preferably ca, 8 mm. Alternatively or additionally it is conceivable that the flexible material 33 comprises electrical properties, for example an electric surface resistance of $\geq 10^6$ ohm and/or a surface resistivity of $10^7$ ohm/square to $10^{12}$ ohm/square, in particular of $2\times 10^7$ ohm/square. In this way it is possible to prevent, at least reduce to a minimum, an electrostatic charge of the flexible material 33. In this way the loading and unloading of the article container 1 can be improved, in particular an undesired adherence of the article 5 by means of electrostatic forces can be prevented. Further, any damaging effects by electrostatic discharges can be avoided. It has become apparent that the specified interval is a best-possible compromise between a use of the electrically conductive fibers 121 and a good protection of the article 5 against an adherence and any damaging electrical discharges. In this case, a best-possible result can be achieved with a minimum use of material of the electrically conductive fibers 121.

Finally it should be noted that the article containers 1 described above can also be referred to as a hanging bag. The article container 1 can accommodate a single article 5 or several articles 5.

It should also be noted that it may also prove advantageous, even though this is not mandatory, that the loading station 87 and/or unloading station 105 comprises the optional locking device 97, with the help of which the article container 1 is maintained in the provisioning position (and/or loading position and/or unloading position). According to the embodiment shown the locking device comprises the fixing plate 123 which is adjustable via another drive not depicted in more detail between a first position and a second position and interacts with the suspended support 119. In the first position the suspended support 119 can be moved relative to the fixing plate 123 and in the second position the suspended support 119 is fixed/held.

Even if according to the embodiments shown the opening device 107 and/or the actuation device shows a single bag opening flap 101, it is possible that a second bag opening flap (not depicted in more detail) is additionally provided, which is adjustable via a drive between a first position and a second position. The first bag opening flap and second bag opening flap are disposed at both sides of the frame 31. According to such an embodiment, the drives 103 are controlled synchronously.

The embodiment of the bag opening flap(s) 101 actively driven by means of the drive(s) 103 has the advantage that the frame 31 is handled with care.

LIST OF REFERENCE NUMBERS 1 article container
3 overhead conveying device
5 article
7 opened vertical side
9 closed vertical side
11 bottom
13 discharge device
15 storage incline
17 discharge incline
19 top side
21 pusher dog mechanism
23 yaw axis
25 tripping lever
27 protrusion
29 sliding surface
31 frame
33 material
35 rerouting mechanism
37 hook
39 arrow
41 arrow
43 arrow
45 fabric conduit
47 end
49 guide knob
51 direction of movement
53 eyelet
55 arrow
57 planking
59 surface
61 conveying arrangement
63 conveying path
65 front wall
67 rear wall
69 storage space
71 first longitudinal edge
73 second longitudinal edge
75 first end edge
77 second end edge
79 loading and/or unloading opening
81 side wall stop
83 first folding edges
85 second folding edges 87 loading station
89 opening device
91 loading device
93 feeding device
95 working plane
97 locking device
99 guide profile
101 bag opening flap
103 drive
105 unloading station
107 opening device
109 unloading device
111 unloading drive
113 bag unloading device
115 guide crosspiece
117 overhead conveying system
119 suspended support
123 fixing plate
125 curved arrow
127 drag bearing
129 other drag bearing
131 form fit
133 receiving surface
135 first arrow
137 second arrow
139 third arrow
141 stationary wall

The invention claimed is:

1. An article container (1) for an overhead conveying device (3) for transporting an article (5), comprising
a front wall (65),
a rear wall (67),
a bottom (11) adjoining the front wall (65) and the rear wall (67) having
a first longitudinal edge (71), to which the front wall (65) is adjoined,
a second longitudinal edge (73) extending spaced apart from the first longitudinal edge (71), to which the rear wall (67) is adjoined,
a first end edge (75) extending between the first longitudinal edge (71) and the second longitudinal edge (73), and
a second end edge (77) extending between the first longitudinal edge (71) and the second longitudinal edge (73),
wherein the first longitudinal edge (71) forms a first folding edge (83) and the second longitudinal edge (73) forms a second folding edge (85),
wherein a width of the bottom (11) between the folding edges (83,85) is between 5 mm and 800 mm,
a frame (31), by means of which the article container (1) is adjustable between an opened position and a closed position,
wherein the front wall (65), the rear wall (67) and the bottom (11) of the article container (1) comprise a flexible material (33) suspended on the frame (31),
a storage space (69) for accommodating the article (5) and arranged between the front wall (65), the rear wall (67) and the bottom (11), which is accessible in the opened position and which is of reduced volume in the closed position,
in the opened position, a loading and/or unloading opening (79, 79') delimited by the front wall (65) and the rear wall (67) and adjoining the first end edge (75), through which the article container (1) can be loaded and/or unloaded with the article (5),
wherein the bottom (11) has a receiving surface (133) ending in the loading and/or unloading opening (79, 79'),
a planking (57) for the at least partial stiffening of the article container (1), which is arranged at least at the bottom (11) and having a sliding surface (29),
wherein the receiving surface (133), co-operating with the article (5), extends between the two longitudinal edges (71, 73) and the two end edges (75, 77), and defines the sliding surface (29).

2. The article container according to claim 1, wherein the storage space (69) is formed between the bottom (11), the front wall (65), the rear wall (67) and a side wall stop (81) disposed opposite the loading and/or unloading opening (79, 79').

3. The article container according to claim 1, wherein the article container (1) comprises a side wall stop (81) adjoining the second end edge (77), against which the article (5) can be applied during a transport of the article (5) or a loading of the article container.

4. The article container according to claim 1, wherein the article container (1) has an opening delimited by the front wall (65) and the rear wall (67) and adjoining the second end edge (77), which forms a loading and/or unloading opening (79').

5. The article container according to claim 3, wherein in a suspended state of the article container (1) the bottom (11) comprises a storage incline (15) toward the side wall stop (81) between the first end edge (75) and the second end edge (77).

6. The article container according to claim 1, wherein the article container (1) comprises an opened top side (19) opposite the bottom (11) for loading with the article (5).

7. The article container according to claim 1, wherein the flexible material (33) comprises at least one of the following electrical properties: an electrical surface resistance of greater than or equal to $10^6$ ohm, a surface resistivity between $10^7$ ohm/square and $10^{12}$ ohm/square.

8. The article container according to claim 7, wherein the flexible material (33) comprises a surface resistivity of $2\times10^7$ ohm/square.

9. The article container according to claim 1, wherein the flexible material is antistatic.

10. The article container according to claim 1, wherein the flexible material (33) comprises electrically conductive fibers (121) and/or electrically conductive wires.

11. The article container according to claim 10, wherein the electrically conductive fibers (121) are inserted into the flexible material at a distance of between 1 mm and 15 mm.

12. The article container according to claim 10, wherein the electrically conductive fibers (121) comprise a carbon fiber material.

13. The article container according to claim 1, wherein the article container (1) comprises a tripping lever (25) connected to the bottom (11).

14. An overhead conveying device (3) having an article container (1) for transporting an article (5), wherein the article container (1) comprises
a front wall (65),
a rear wall (67),
a bottom (11) adjoining the front wall (65) and the rear wall (67) having
a first longitudinal edge (71), to which the front wall (65) is adjoined,
a second longitudinal edge (73) extending spaced apart from the first longitudinal edge (71), to which the rear wall (67) is adjoined, a first end edge (75) extending between the first longitudinal edge (71) and the second longitudinal edge (73), and a second end edge (77) extending between the first longitudinal edge (71) and the second longitudinal edge (73), wherein the first longitudinal edge (71) forms a first folding edge (83) and the second longitudinal edge (73) forms a second folding edge (85), wherein a width of the bottom (11) between the folding edges (83,85) is between 5 mm and 800 mm, a frame (31), by means of which the article container (1) is adjustable between an opened position and a closed position, wherein the front wall (65), the rear wall (67) and the bottom (11) of the article container (1) comprise a flexible material (33) suspended on the frame (31), a storage space (69) for accommodating the article (5) and arranged between the front wall (65), the rear wall (67) and the bottom (11), which is accessible in the opened position and which is of reduced volume in the closed position, in the opened position, a loading and/or unloading opening (79, 79') delimited by the front wall (65) and the rear wall (67) and adjoining the first end edge (75), through which the article container (1) can be loaded and/or unloaded with the article (5), wherein the bottom (11) has a receiving surface (133) ending in the loading and/or unloading opening (79, 79'), a planking (57) for the at least partial stiffening of the article container (1), which is arranged at least at the bottom (11) and having a sliding surface (29), wherein the receiving surface (133), co-operating with the article (5), extends between the two longitudinal edges (71, 73) and the two end edges (75, 77), and defines the sliding surface (29).

15. A loading station (87) for manual or automated loading of an article container (1) with an article (5),
the article container comprising:
a front wall (65),
a rear wall (67),
a bottom (11) adjoining the front wall (65) and the rear wall (67) having
a first longitudinal edge (71), to which the front wall (65) is adjoined,
a second longitudinal edge (73) extending spaced apart from the first longitudinal edge (71), to which the rear wall (67) is adjoined,
a first end edge (75) extending between the first longitudinal edge (71) and the second longitudinal edge (73), and
a second end edge (77) extending between the first longitudinal edge (71) and the second longitudinal edge (73),
a frame (31), by means of which the article container (1) is adjustable between an opened position and a closed position,
wherein the front wall (65), the rear wall (67) and the bottom (11) of the article container (1) comprise a flexible material (33) suspended on the frame (31),
a storage space (69) for accommodating the article (5) and arranged between the front wall (65), the rear wall (67) and the bottom (11),
in the opened position, an opening (79, 79') delimited by the front wall (65) and the rear wall (67) and adjoining the first end edge (75), through which the article container (1) can be loaded with the article (5),
wherein the bottom (11) has a receiving surface (133) ending in the opening (79, 79'),
a planking (57) for the at least partial stiffening of the article container (1), which is arranged at least at the bottom (11),
wherein the receiving surface (133), co-operating with the article (5), extends between the two longitudinal edges (71, 73) and the two end edges (75, 77), and defines a sliding surface (29), and
the loading station (87) comprising:
an overhead conveying device (3) for transporting the article container (1) into the loading station (87) and transporting the article container (1) out of the loading station (87),
an opening device (89, 107) for adjusting the article container (1) between the closed position, in which the storage space (69) is of reduced volume, and the opened position, in which the storage space (69) is accessible, and
for loading the article container (1), which has been adjusted into the opened position,
i) either a loading device (91),
ii) or a feeding device (93) driven in an automated manner,
iii) or the loading device (91) and the feeding device (93) driven in an automated manner,
and wherein the loading device (91) or the feeding device (93) defines a working plane (95), which extends essentially in alignment with the bottom (11) of the article container (1) or slightly above the bottom (11) of the article container (1), so that an essentially continuous transition between the working plane (95) and the bottom (11) is formed.

16. The loading station (87) according to claim 15, wherein a locking device (97) for temporarily fixing the article container (1) during a loading operation is additionally provided.

17. The loading station according to claim 15, wherein a guide profile (99) for guiding the frame (31) of the article container (1) is additionally provided.

18. The loading station according to claim 15, wherein the opening device (107) of the loading station (87) comprises at least one bag opening flap (101) movable by means of a drive (103) between a first flap position and a second flap position for adjusting the article container (1) between the closed position and the opened position.

19. The loading station according to claim 18, wherein the bag opening flap (101) in the second flap position comprises a guide surface (115) for guiding the frame (31) during a leaving of the loading station (87), which extends in a direction of movement of the article container (1).

20. The loading station according to claim 15, wherein the sliding surface (29) is formed on the planking (57), which is arranged at least at the bottom (11).

21. An unloading station (105) for unloading an article container (1) loaded with an article (5),
the article container comprising:
a front wall (65),
a rear wall (67),
a bottom (11) adjoining the front wall (65) and the rear wall (67) having
a first longitudinal edge (71), to which the front wall (65) is adjoined, a second longitudinal edge (73) extending spaced apart from the first longitudinal edge (71), to which the rear wall (67) is adjoined, a first end edge (75) extending between the first longitudinal edge (71) and the second longitudinal edge (73), and a second end edge (77) extending between the first longitudinal edge (71) and the second longitudinal edge (73), a frame (31), by means of which the article container (1) is adjustable between an opened position and a closed position, wherein the front wall (65), the rear wall (67) and the bottom (11) of the article container (1) comprise a flexible material (33) suspended on the frame (31), a storage space (69) for accommodating the article (5) and arranged between the front wall (65), the rear wall (67) and the bottom (11), in the opened position, an opening (79, 79') delimited by the front wall (65) and the rear wall (67) and adjoining the first end edge (75), through which the article container (1) can be unloaded with the article (5), wherein the bottom (11) has a receiving surface (133) ending in the opening (79, 79'), a planking (57) for the at least partial stiffening of the article container (1), which is arranged at least at the bottom (11), wherein the receiving surface (133), co-operating with the article (5), extends between the two longitudinal edges (71, 73) and the two end edges (75, 77), and defines a sliding surface (29), and the unloading station (105) comprising:

an overhead conveying device (3) for transporting the article container (1) into the unloading station (105) and transporting the article container (1) out of the unloading station (105), an opening device (89, 107) for adjusting the article container (1) between the closed position, in which the article (5) is stowed in the storage space (69), and the opened position, in which the article (5) is accessible in the storage space (69), and an unloading device (109) for unloading the article container (1), which has been adjusted into the opened position, with the help of which the bottom (11) is inclinable between a transport position, in which the article (5) is stored in the storage space (69), and a discharge position, in which the article (5) is discharged from the storage space (69).

22. The unloading station according to claim 21, wherein a locking device (97) for temporarily fixing the article container during an unloading operation is additionally provided.

23. The unloading station according claim 21, wherein a guide profile (99) for guiding the frame (31) of the article container (1) is additionally provided.

24. The unloading station according to claim 21, wherein the opening device (107) comprises at least one bag opening flap (101) movable by means of a drive (103) between a first flap position and a second flap position for adjusting the article container (1) between the closed position and the opened position.

25. The unloading station according to claim 24, wherein the bag opening flap (101) in the second flap position comprises a guide surface (115) for guiding the frame (31) during a leaving of the unloading station (105) which extends in a direction of movement of the article container (1).

26. The unloading station according to claim 21, wherein the sliding surface (29) is formed on the planking (57), which is arranged at least at the bottom (11).

27. The unloading station according to claim 21, wherein the unloading device (109) comprises a pusher dog mechanism (21), by means of which the bottom (11) is adjustable between the transport position and the discharge position.

28. The unloading station according to claim 21, wherein the unloading device (109) comprises a bag unloading device (113) movable by means of an unloading drive (111) between an initial position and an actuation position for adjusting the bottom (11) between the transport position and the discharge position.

29. An overhead conveying system (117) comprising an overhead conveying device (3) having an article container (1) for transporting an article (5), a loading station (87) for manual or automated loading of the article container (1) and an unloading station (105) for unloading the article container (1) loaded with the article (5), the article container comprising:

a front wall (65), a rear wall (67), a bottom (11) adjoining the front wall (65) and the rear wall (67) having a first longitudinal edge (71), to which the front wall (65) is adjoined, a second longitudinal edge (73) extending spaced apart from the first longitudinal edge (71), to which the rear wall (67) is adjoined, a first end edge (75) extending between the first longitudinal edge (71) and the second longitudinal edge (73), and a second end edge (77) extending between the first longitudinal edge (71) and the second longitudinal edge (73), a frame (31), by means of which the article container (1) is adjustable between an opened position and a closed position, wherein the front wall (65), the rear wall (67) and the bottom (11) of the article container (1) comprise a flexible material (33) suspended on the frame (31), a storage space (69) for accommodating the article (5) and arranged between the front wall (65), the rear wall (67) and the bottom (11), in the opened position, an opening (79, 79') delimited by the front wall (65) and the rear wall (67) and adjoining the first end edge (75), through which the article container (1) can be loaded and unloaded with the article (5), wherein the bottom (11) has a receiving surface (133) ending in the opening (79, 79'), a planking (57) for the at least partial stiffening of the article container (1), which is arranged at least at the bottom (11), wherein the receiving surface (133), co-operating with the article (5), extends between the two longitudinal edges (71, 73) and the two end edges (75, 77), and defines a sliding surface (29), and the loading station (87) comprising:

an overhead conveying device (3) for transporting the article container (1) into the loading station (87) and transporting the article container (1) out of the loading station (87), an opening device (89, 107) for adjusting the article container (1) between the closed position, in which the storage space (69) is of reduced volume, and the opened position, in which the storage space (69) is accessible, and for loading the article container (1), which has been adjusted into the opened position, i) either a loading device (91), ii) or a feeding device (93) driven in an automated manner, iii) or the loading device (91) and the feeding device (93) driven in an automated manner, and wherein the loading device (91) or the feeding device (93) defines a working plane (95), which extends essentially in alignment with the bottom (11) of the article container (1) or slightly above the bottom (11) of the article container (1), so that an essentially continuous transition between the working plane (95) and the bottom (11) is formed, and the unloading station (105) comprising:

an overhead conveying device (3) for transporting the article container (1) into the unloading station (105) and transporting the article container (1) out of the unloading station (105), an opening device (89, 107) for adjusting the article container (1) between the closed position, in which the article (5) is stowed in the storage space (69), and the opened position, in which the article (5) is accessible in the storage space (69), and an unloading device (109) for unloading the article container (1), which has been adjusted into the opened position, with the help of which the bottom (11) is inclinable between a transport position, in which the article (5) is stored in the storage space (69), and a discharge position, in which the article (5) is discharged from the storage space (69).

30. The overhead conveying system according to claim 29, further comprising a suspended support (119) conveyable in a direction of movement of the article container (1), which is fixable in the loading station (87) and/or the unloading station (105) by means of a locking device (97).

31. The overhead conveying system according to claim 30, wherein the locking device (97) is either releasable or fixable by means of a fixing plate (123) which is adjustable between an initial position and a fixed position.

32. A method for unloading an article (5) from an article container (1) comprising a bottom (11), a storage space (69) and an opening (79, 79'), in which the article container (1) is transported on an overhead conveying device (3) to an unloading station (105) into a provisioning position and at the unloading station (105)

i) in a first step is adjusted by means of an opening device (89, 107) or by an operator from a closed position, in which the article (5) is stowed in the storage space (69), into an opened position, in which the article (5) is accessible in the storage space (69), and subsequently ii) in a second step the bottom (11) is inclined by means of an unloading device (109) or by an operator from a transport position, in which the article (5) is stored in the storage space (69), into a discharge position, in which the article (5) is discharged from the storage space (69), so that in the discharge position a rear region of the bottom positioned opposite the opening (79, 79') is positioned higher than a front region of the bottom, and the article (5) slides out of the article container (1).

33. The method for the manual or automated loading of an article container (1) with an article (5), the article container comprising:

a front wall (65), a rear wall (67), a bottom (11) adjoining the front wall (65) and the rear wall (67) having a first longitudinal edge (71), to which the front wall (65) is adjoined, a second longitudinal edge (73) extending spaced apart from the first longitudinal edge (71), to which the rear wall (67) is adjoined, a first end edge (75) extending between the first longitudinal edge (71) and the second longitudinal edge (73), and a second end edge (77) extending between the first longitudinal edge (71) and the second longitudinal edge (73), a frame (31), by means of which the article container (1) is adjustable between an opened position and a closed position, wherein the front wall (65), the rear wall (67) and the bottom (11) of the article container (1) comprise a flexible material (33) suspended on the frame (31), a storage space (69) for accommodating the article (5) and arranged between the front wall (65), the rear wall (67) and the bottom (11), in the opened position, an opening (79, 79') delimited by the front wall (65) and the rear wall (67) and adjoining the first end edge (75), through which the article container (1) can be loaded with the article (5), wherein the bottom (11) has a receiving surface (133) ending in the opening (79, 79'), a planking (57) for the at least partial stiffening of the article container (1), which is arranged at least at the bottom (11), wherein the receiving surface (133), co-operating with the article (5), extends between the two longitudinal edges (71, 73) and the two end edges (75, 77), and defines a sliding surface (29), the method for the manual or automated loading of the article container comprising:

transporting the article container (1) on an overhead conveying device (3) to a loading station (87) and provisioning the article container (1) in a provisioning position in front of a loading device (91) or a feeding device (93), wherein i) in a first step the article container (1) is adjusted by means of an opening device (89, 107) or by an operator from a closed position, in which the storage space (69) is reduced in volume, into an opened position, in which the storage space (69) is accessible, and subsequently ii) in a second step the article (5) is brought by the loading device (91) or by the feeding device (93) or by an operator into the storage space (69) of the article container (1), which has been adjusted into the opened position, wherein a working plane (95) at the loading device (91) or the feeding device (93) is essentially in alignment with the bottom (11) of the article container (1) or extends slightly above the bottom (11) of the article container (1).

34. An article container (1) for an overhead conveying device (3) for transporting an article (5), comprising a front wall (65), a rear wall (67), a bottom (11) adjoining the front wall (65) and the rear wall (67) having
- a first longitudinal edge (71), to which the front wall (65) is adjoined,
- a second longitudinal edge (73) extending spaced apart from the first longitudinal edge (71), to which the rear wall (67) is adjoined,
- a first end edge (75) extending between the first longitudinal edge (71) and the second longitudinal edge (73), and
- a second end edge (77) extending between the first longitudinal edge (71) and the second longitudinal edge (73), a frame (31), by means of which the article container (1) is adjustable between an opened position and a closed position, wherein the front wall (65), the rear wall (67) and/or the bottom (11) of the article container (1) comprises a flexible material (33) suspended on the frame (31), wherein the flexible material (33) comprises at least one of the following electrical properties: an electrical surface resistance of greater than or equal to $10^6$ ohm, a surface resistivity between $10^7$ ohm/square and $10^{12}$ ohm/square, a storage space (69) for accommodating the article (5) and arranged between the front wall (65), the rear wall (67) and the bottom (11), which is accessible in the opened position and which is of reduced volume in the closed position, in the opened position, a loading and/or unloading opening (79, 79') delimited by the front wall (65) and the rear wall (67) and adjoining the first end edge (75), through which the article container (1) can be loaded and/or unloaded with the article (5), wherein the bottom (11) has a receiving surface (133) ending in the loading and/or unloading opening (79, 79'), a planking (57) for the at least partial stiffening of the article container (1), which is arranged at least at the bottom (11) and having a sliding surface (29), wherein the receiving surface (133), co-operating with the article (5), extends between the two longitudinal edges (71, 73) and the two end edges (75, 77), and defines the sliding surface (29).

35. An article container (1) for an overhead conveying device (3) for transporting an article (5), comprising
a front wall (65),
a rear wall (67),
a bottom (11) adjoining the front wall (65) and the rear wall (67) having
- a first longitudinal edge (71), to which the front wall (65) is adjoined,
- a second longitudinal edge (73) extending spaced apart from the first longitudinal edge (71), to which the rear wall (67) is adjoined,
- a first end edge (75) extending between the first longitudinal edge (71) and the second longitudinal edge (73), and
- a second end edge (77) extending between the first longitudinal edge (71) and the second longitudinal edge (73), a frame (31), by means of which the article container (1) is adjustable between an opened position and a closed position, wherein the front wall (65), the rear wall (67) and/or the bottom (11) of the article container (1) comprises a flexible material (33) suspended on the frame (31), wherein the flexible material is antistatic, a storage space (69) for accommodating the article (5) and arranged between the front wall (65), the rear wall (67) and the bottom (11), which is accessible in the opened position and which is of reduced volume in the closed position, in the opened position, a loading and/or unloading opening (79, 79') delimited by the front wall (65) and the rear wall (67) and adjoining the first end edge (75), through which the article container (1) can be loaded and/or unloaded with the article (5), wherein the bottom (11) has a receiving surface (133) ending in the loading and/or unloading opening (79, 79'), a planking (57) for the at least partial stiffening of the article container (1), which is arranged at least at the bottom (11) and having a sliding surface (29), wherein the receiving surface (133), co-operating with the article (5), extends between the two longitudinal edges (71, 73) and the two end edges (75, 77), and defines the sliding surface (29).

36. An article container (1) for an overhead conveying device (3) for transporting an article (5), comprising
a front wall (65),
a rear wall (67),
a bottom (11) adjoining the front wall (65) and the rear wall (67) having
- a first longitudinal edge (71), to which the front wall (65) is adjoined,
- a second longitudinal edge (73) extending spaced apart from the first longitudinal edge (71), to which the rear wall (67) is adjoined,
- a first end edge (75) extending between the first longitudinal edge (71) and the second longitudinal edge (73), and
- a second end edge (77) extending between the first longitudinal edge (71) and the second longitudinal edge (73), a frame (31), by means of which the article container (1) is adjustable between an opened position and a closed position, wherein the front wall (65), the rear wall (67) and/or the bottom (11) of the article container (1) comprises a flexible material (33) suspended on the frame (31), wherein the flexible material (33) comprises electrically conductive fibers (121) and/or electrically conductive wires, a storage space (69) for accommodating the article (5) and arranged between the front wall (65), the rear wall (67) and the bottom (11), which is accessible in the opened position and which is of reduced volume in the closed position, in the opened position, a loading and/or unloading opening (79, 79') delimited by the front wall (65) and the rear wall (67) and adjoining the first end edge (75), through which the article container (1) can be loaded and/or unloaded with the article (5), wherein the bottom (11) has a receiving surface (133) ending in the loading and/or unloading opening (79, 79'), a planking (57) for the at least partial stiffening of the article container (1), which is arranged at least at the bottom (11) and having a sliding surface (29), wherein the receiving surface (133), co-operating with the article (5), extends between the two longitudinal edges (71, 73) and the two end edges (75, 77), and defines the sliding surface (29).

37. An article container (1) for an overhead conveying device (3) for transporting an article (5), which is adjustable between an opened position and a closed position, comprising
    a front wall (65),
    a rear wall (67),
    a bottom (11) adjoining the front wall (65) and the rear wall (67) having
        a first longitudinal edge (71), to which the front wall (65) is adjoined,
        a second longitudinal edge (73) extending spaced apart from the first longitudinal edge (71), to which the rear wall (67) is adjoined,
        a first end edge (75) extending between the first longitudinal edge (71) and the second longitudinal edge (73), and
        a second end edge (77) extending between the first longitudinal edge (71) and the second longitudinal edge (73),
    a storage space (69) for accommodating the article (5) and arranged between the front wall (65), the rear wall (67) and the bottom (11), which is accessible in the opened position and which is of reduced volume in the closed position,
    in the opened position, a loading and/or unloading opening (79, 79') delimited by the front wall (65) and the rear wall (67) and adjoining the first end edge (75),
    a side wall stop (81) adjoining the second end edge (77), against which the article (5) can be applied during a transport of the article (5),
    wherein the bottom (11) is inclined toward the side wall stop (81) in order to achieve a safe transport of the article (5).

38. The article container according to claim 37, wherein the article container (1) further comprises
    a frame (31), by means of which the article container (1) is adjustable between the opened position and the closed position, and
    a flexible material (33) suspended on the frame (31),
    wherein the front wall (65), the rear wall (67) and the bottom (11) of the article container (1) comprise the flexible material (33).

39. The article container according to claim 38, wherein the flexible material (33) is at least partially planked for the at least partial stiffening of the article container (1).

40. The article container according to claim 37, wherein the bottom (11) has a receiving surface (133) ending in the loading and/or unloading opening (79, 79'), on which the article (5) can be supported when the article container (1) is adjusted into the opened position.

41. The article container according to claim 38, wherein the bottom (11) comprises a planking (57) for the at least partial stiffening of the article container (1).

42. The article container according to claim 41, wherein in the closed position of the article container (1), the article (5) is held between the flexible material (33) and the bottom (11).

* * * * *